US010891166B2

(12) United States Patent
Shibayama et al.

(10) Patent No.: US 10,891,166 B2
(45) Date of Patent: *Jan. 12, 2021

(54) STORAGE SYSTEM AND INFORMATION MANAGEMENT METHOD HAVING A PLURALITY OF REPRESENTATIVE NODES AND A PLURALITY OF GENERAL NODES INCLUDING A PLURALITY OF RESOURCES

(71) Applicant: Hitachi, Ltd., Tokyo (JP)

(72) Inventors: Tsukasa Shibayama, Tokyo (JP); Hiroto Ebara, Tokyo (JP); Akiyoshi Tsuchiya, Tokyo (JP); Tomohiro Kawaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 15 days.

This patent is subject to a terminal disclaimer.

(21) Appl. No.: 16/298,013

(22) Filed: Mar. 11, 2019

(65) Prior Publication Data

US 2020/0019438 A1 Jan. 16, 2020

(30) Foreign Application Priority Data

Jul. 13, 2018 (JP) ................................ 2018-133729

(51) Int. Cl.
*G06F 9/46* (2006.01)
*G06F 9/50* (2006.01)
(52) U.S. Cl.
CPC ............ *G06F 9/505* (2013.01); *G06F 9/5016* (2013.01)
(58) Field of Classification Search
None
See application file for complete search history.

(56) References Cited

U.S. PATENT DOCUMENTS

| 8,612,700 B1* | 12/2013 | Armstrong .......... G06F 11/1451 711/161 |
| 9,135,016 B1* | 9/2015 | O'Connell .......... G06F 16/1844 |
| 2011/0153603 A1 | 6/2011 | Adiba et al. |
| 2014/0122433 A1 | 5/2014 | Murata |
| 2018/0136973 A1 | 5/2018 | Tashiro et al. |

FOREIGN PATENT DOCUMENTS

| JP | 2014089605 A | 5/2014 |
| JP | 2016177724 A | 10/2016 |
| JP | 2018081392 A | 5/2018 |

OTHER PUBLICATIONS

Japanese Office Action received in corresponding Japanese Application No. 2018-133729 dated Jul. 7, 2020.

* cited by examiner

*Primary Examiner* — Gregory A Kessler
(74) *Attorney, Agent, or Firm* — Mattingly & Malur, PC

(57) ABSTRACT

According to one embodiment, a storage system includes a representative node and a plurality of general nodes including a plurality of resources. Each of the general nodes stores resource status information indicating respective statuses of the plurality of resources in a first storage unit thereof. The representative node stores resource status information collected from the plurality of general nodes in a second storage unit thereof, decides whether to acquire the resource status information from the first storage unit of the general node or to acquire the resource status information from the second storage unit based on a received request, and transmits the resource status information acquired from a decided acquisition destination to an issuing source of the request.

13 Claims, 24 Drawing Sheets

FIG. 7

Table 701:

| RESOURCE ID | CAPACITY | NAME | PD ID | Pool ID | Node ID | MOVEMENT HISTORY | ... |
|---|---|---|---|---|---|---|---|
| 1 | 100 | Volume1 | 1 | 1 | 1 | NODE 2 | |
| 2 | | | 1 | 1 | 1,2 | - | |
| 3 | | | 1 | 2 | 1 | NODE 2 ===> NODE 3 | |
| ... | | | | | | | |

Table 702:

| RESOURCE ID | CAPACITY | NAME | PD ID | ... |
|---|---|---|---|---|
| 1 | 1000 | Pool1 | 1 | |
| 2 | | | 1 | |
| ... | | | | |

Table 703:

| NODE ID | RESOURCE ID | CAPACITY | PD ID | RELATED POOL ID | ... |
|---|---|---|---|---|---|
| 1 | 1 | 10 | 1 | 1 | |
| 1 | 2 | 10 | 1 | 2 | |
| | ... | | | | |
| 2 | 1 | | 2 | | |
| | ... | | | | |
| ... | | | | | |

FIG. 9

| | RESOURCE TYPE | METRIC | COLLECTION CYCLE | CONFIGURATION CONDITION | RETENTION PERIOD |
|---|---|---|---|---|---|
| DETAILS | Volume | IOPS | 1sec | EQUAL TO OR LESS THAN 100 vol | 1day |
| | | | 5sec | EQUAL TO OR MORE THAN 101 vol | 1day |
| | | Transfer Rate | 1sec | EQUAL TO OR LESS THAN 100 vol | 1day |
| | | ... | | | |
| | Port | | 1sec | - | 1day |
| | Drive | | 1sec | - | 1day |
| | Pool | | 10sec | - | 1day |
| | ... | | | | |
| SUMMARY | Cluster | | 1min | - | 7day |
| | Volume | IOPS | 1min | EQUAL TO OR LESS THAN 100 vol | 7day |
| | | | 5min | EQUAL TO OR MORE THAN 101 vol | 7day |
| | | Transfer Rate | 1min | EQUAL TO OR LESS THAN 100 vol | 7day |
| | | ... | | | |
| | Port | | 1min | - | 7day |
| | Drive | | 1min | - | 7day |
| | ... | | | | |

Table 1001:

| RESOURCE ID | TIME | IOPS | Transfer Rate | ... |
|---|---|---|---|---|
| 1 | 20170115101010 | | | |
| | 20170115101011 | | | |
| | 20170115101012 | | | |
| | ... | | | |
| 2 | 20170115101010 | | | |
| | 20170115101011 | | | |
| | 20170115101012 | | | |
| | ... | | | |
| ... | | | | |

Table 1002:

| RESOURCE ID | TIME | USED AMOUNT | COMPRESSION RATE | ... |
|---|---|---|---|---|
| 1 | 20170115101010 | | | |
| | 20170115101020 | | | |
| | 20170115101030 | | | |
| | ... | | | |
| 2 | 20170115101010 | | | |
| | 20170115101020 | | | |
| | 20170115101030 | | | |
| | ... | | | |
| ... | | | | |

FIG. 18

| NODE ID | IP ADDRESS | ROLE | STATUS | FAULT SET |
|---|---|---|---|---|
| 1 | 192.168.5.10 | MAIN REPRESENTATIVE | NORMAL | 1 |
| 2 | 192.168.5.11 | SUB-REPRESENTATIVE | NORMAL | 2 |
| 3 | 192.168.5.12 | SUB-REPRESENTATIVE | NORMAL | 3 |
| 4 | 192.168.5.13 | GENERAL | NORMAL | 1 |
| 5 | 192.168.5.14 | GENERAL | NORMAL | 2 |
| 6 | 192.168.5.16 | GENERAL | ABNORMAL | 3 |
| 7 | 192.168.5.17 | GENERAL | NORMAL | 1 |
| 8 | 192.168.5.18 | GENERAL | NORMAL | 2 |
| 9 | 192.168.5.19 | GENERAL | NORMAL | 3 |

FIG. 21

| NODE ID | IP ADDRESS | ROLE | STATUS | CONFIGURATION INFORMATION SYNCHRONIZATION TIME |
|---|---|---|---|---|
| 1 | 192.168.5.10 | MAIN REPRESENTATIVE | NORMAL | 2018/3/8/12:30:05 |
| 2 | 192.168.5.11 | SUB-REPRESENTATIVE | NORMAL | 2018/3/8/12:00:10 |
| 3 | 192.168.5.12 | SUB-REPRESENTATIVE | NORMAL | 2018/3/8/11:30:00 |
| 4 | 192.168.5.13 | GENERAL | NORMAL | - |
| 5 | 192.168.5.14 | GENERAL | NORMAL | - |
| 6 | 192.168.5.16 | GENERAL | ABNORMAL | - |
| 7 | 192.168.5.17 | GENERAL | NORMAL | - |

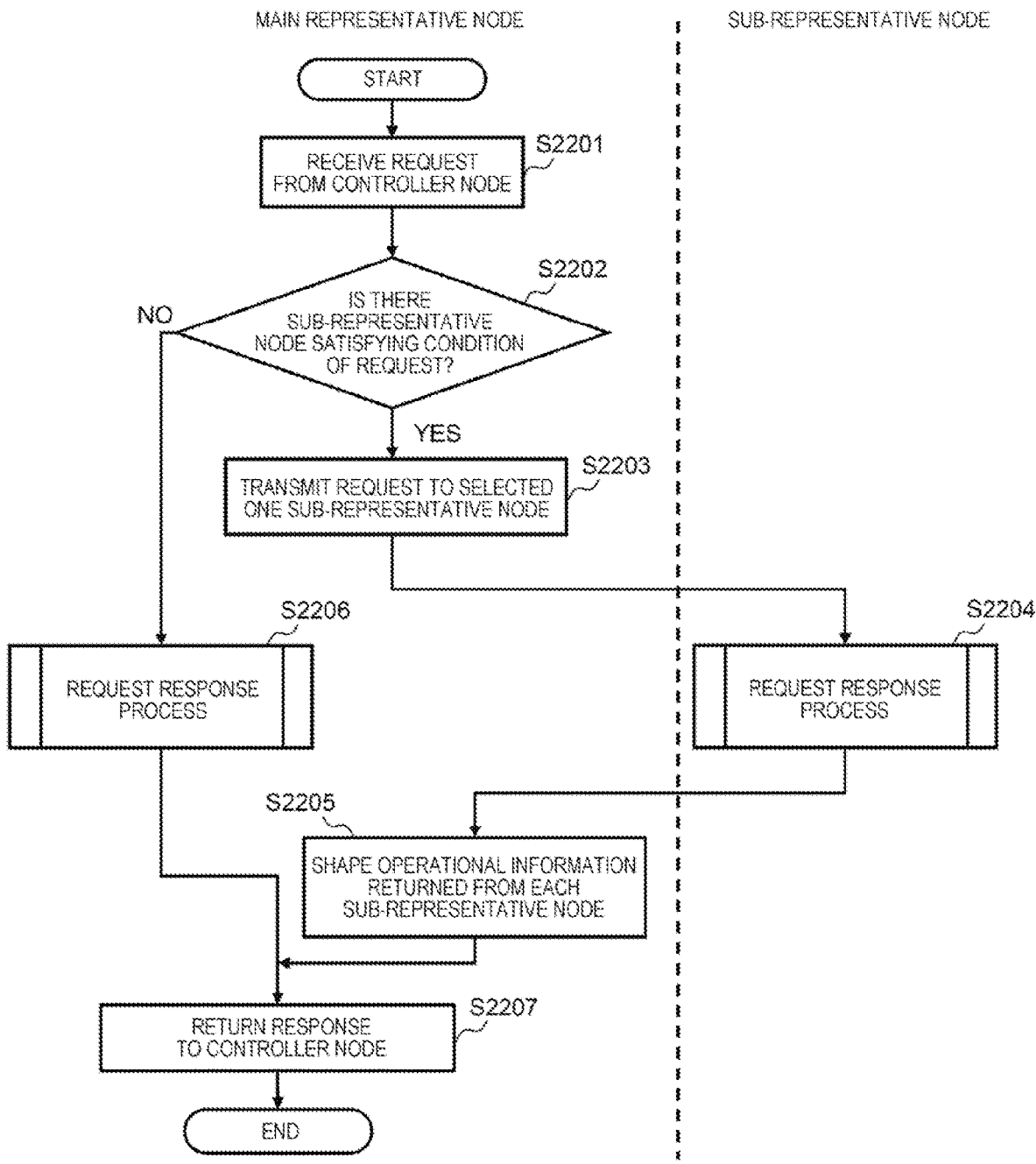

FIG. 23

| MONITOR INFORMATION TYPE | RESOURCE TYPE | METRIC | COLLECTION CYCLE | CONFIGURATION CONDITION | RETENTION PERIOD | THRESHOLD UPPER LIMIT | THRESHOLD LOWER LIMIT |
|---|---|---|---|---|---|---|---|
| DETAILS | Volume | IOPS | 1sec | EQUAL TO OR LESS THAN 100 vol | 1day | - | 100 |
| | | | 5sec | EQUAL TO OR MORE THAN 101 vol | 1day | - | 100 |
| | | Transfer Rate | 1sec | EQUAL TO OR LESS THAN 100 vol | 1day | 50 | 10 |
| | | ... | | | | | |
| | Port | | 1sec | - | 1day | | |
| | Drive | | 1sec | - | 1day | | |
| | Pool | | 10sec | - | 1day | | |
| | ... | | | | | | |
| SUMMARY | Cluster | | 1min | - | 7day | | |
| | Volume | IOPS | 1min | EQUAL TO OR LESS THAN 100 vol | 7day | 100k | 10k |
| | | | 5min | EQUAL TO OR MORE THAN 101 vol | 7day | 100k | 10k |
| | | Transfer Rate | 1min | EQUAL TO OR LESS THAN 100 vol | 7day | 50k | 10k |
| | | ... | | | | | |
| | Port | | 1min | - | 7day | | |
| | Drive | | 1min | - | 7day | | |
| | ... | | | | | | |

2301

STORAGE SYSTEM AND INFORMATION MANAGEMENT METHOD HAVING A PLURALITY OF REPRESENTATIVE NODES AND A PLURALITY OF GENERAL NODES INCLUDING A PLURALITY OF RESOURCES

CROSS-REFERENCE TO RELATED APPLICATION

The present application claims priority from Japanese application JP 2018-133729, filed on Jul. 13, 2018, the contents of which is hereby incorporated by reference into this application.

BACKGROUND OF THE INVENTION

1. Field of the Invention

The present invention relates to a storage system and an information management method, and for example, is suitable for a storage system and an information management method that manage resource status information of resources.

2. Description of Related Art

In the related art, in a storage system configured to handle a plurality of storage devices (hereinafter, appropriately referred to storage nodes) as one cluster by a combination thereof, a collection method or a distributed storage method is used as a method for managing operational information of resources in each storage node.

The collection method is a method in which operational information of all storage nodes is managed by a specific storage node (hereinafter, appropriately referred to a representative node) and operational information of a requested object is returned in accordance with a request from storage management software and the like (see US 2011/0153603). The distributed storage method is a method in which each storage node retains operational information and a representative node inquires of each storage node about whether each storage node retains operational information of a requested object at a request from storage management software and the like, acquires the operational information of the requested object from an inquiry result from each storage node, and returns the acquired operational information.

In the storage system, considering that a storage node, which is not a representative node, is promoted to the representative node when a failure occurs, the storage node allowed to be promoted should have a disk capacity required for the representative node. Thus, it is necessary to reduce the disk capacity required for the representative node. In this regard, in the collection method, since operational information of all storage nodes is retained in the representative node, there is a problem that the disk capacity required for the representative node becomes large.

On the other hand, in the distributed storage method, since the operational information is retained in each storage node, it is possible to reduce the disk capacity required for the representative node. However, in the distributed storage method, whenever there is a request from the storage management software and the like, since each storage node is inquired about whether the operational information of the requested object is retained, there is a problem that the load of a CPU of the entire system increases.

SUMMARY OF THE INVENTION

The invention is devised in view of the foregoing circumstances and proposes a storage system capable of appropriately managing resource status information (for example, operational information) of resources of each storage node.

In order to solve the foregoing problems, according to the invention, there is provided a storage system including a representative node and a plurality of general nodes including a plurality of resources, wherein each of the general nodes stores resource status information indicating respective statuses of the plurality of resources in a first storage unit thereof, and the representative node stores resource status information collected from the plurality of general nodes in a second storage unit thereof, decides whether to acquire the resource status information from the first storage unit of the general node or to acquire the resource status information from the second storage unit based on a received request, and transmits the resource status information acquired from a decided acquisition destination to an issuing source of the request.

In the invention, an information management method in a storage system including a representative node and a plurality of general nodes including a plurality of resources, includes a first step in which each of the general nodes stores resource status information indicating respective statuses of the plurality of resources in a first storage unit thereof, a second step in which the representative node stores resource status information collected from the plurality of general nodes in a second storage unit thereof, and a third step in which the representative node decides whether to acquire the resource status information from the first storage unit of the general node or to acquire the resource status information from the second storage unit based on a received request, and transmits the resource status information acquired from a decided acquisition destination to an issuing source of the request.

In the above-described configuration, the resource status information is stored in the general nodes, the resource status information collected from the general nodes is stored in the representative node, and the acquisition destination is changed in accordance with the received request, so that for example, it is possible to reduce a disk capacity required for the representative node and to reduce the number of queries to the general nodes. As described above, the resource status information is appropriately managed, so that for example, the storage system can be quickly and easily maintained in a normal state.

According to the invention, it is possible to realize a storage system with high maintainability.

BRIEF DESCRIPTION OF THE DRAWINGS

FIG. 7 is a diagram illustrating an example of configuration information according to the first embodiment;

FIG. 9 is a diagram illustrating an example of monitor management information according to the first embodiment;

FIG. 10 is a diagram illustrating an example of monitor information according to the first embodiment;

FIG. 18 is a diagram illustrating an example of storage node management information according to the second embodiment;

FIG. 21 is a diagram illustrating an example of storage node management information according to the third embodiment;

FIG. 22 is a diagram illustrating an example of a procedure related to processing at the time of reception of a request according to the third embodiment;

FIG. 23 is a diagram illustrating an example of monitor management information according to a fourth embodiment.

DESCRIPTION OF EMBODIMENTS

Hereinafter, an embodiment of the invention will be described in detail with reference to the drawings.

(1) First Embodiment

Figure 1:
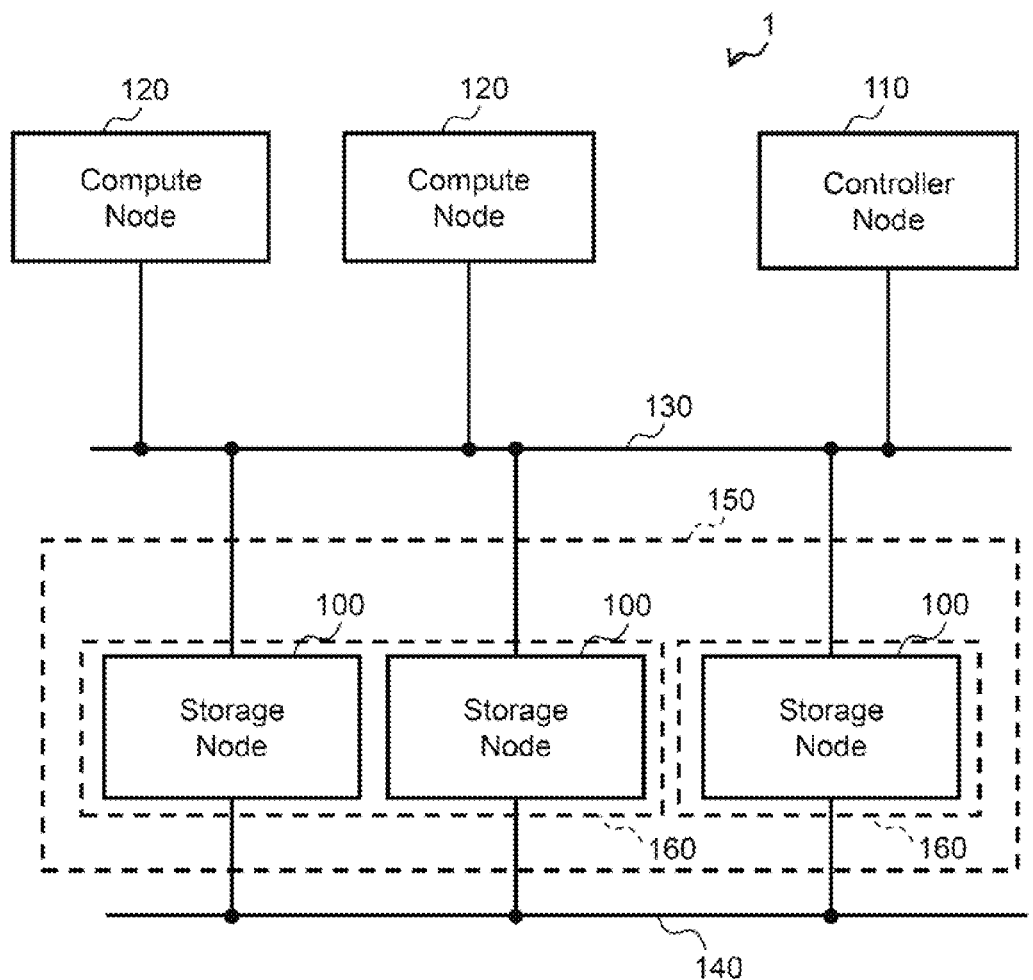
FIG. 1 is a diagram illustrating an example of a configuration related to a storage system according to a first embodiment.

In FIG. 1, reference numeral 1 overall denotes a storage system according to a first embodiment.

The storage system 1 includes storage nodes 100, a controller node 110, and compute nodes 120.

The storage nodes 100, the controller node 110, and the compute nodes 120 are communicably connected to one another via a frontend network 130 (a storage service network). Furthermore, the storage nodes 100 are communicably connected to one another via a backend network 140.

The frontend network 130 and the backend network 140 may be identical to each other. Furthermore, in addition to the frontend network 130 and the backend network 140, a management network may also be provided. For example, the storage nodes 100 and the controller node 110 may also be communicably connected to each other via the management network.

The network (at least one of the frontend network 130, the backend network 140, and the management network) may be redundant. The network may be a wired network or a wireless network. Furthermore, the network may be a different kind of network.

In the storage system 1, a storage cluster 150 includes one or more storage nodes 100. In the storage cluster 150, a protection domain 160 is defined to indicate a data distribution range in the storage cluster 150. The protection domain 160 includes one or a plurality of storage nodes 100. In addition, the protection domain 160 may not be defined (it can also be said that this is equivalent to the fact that one protection domain 160 is defined in the storage cluster 150).

In such a storage system 1, operational information of resources related to each storage node 100 is managed, which will be described in detail below.

Figure 2:
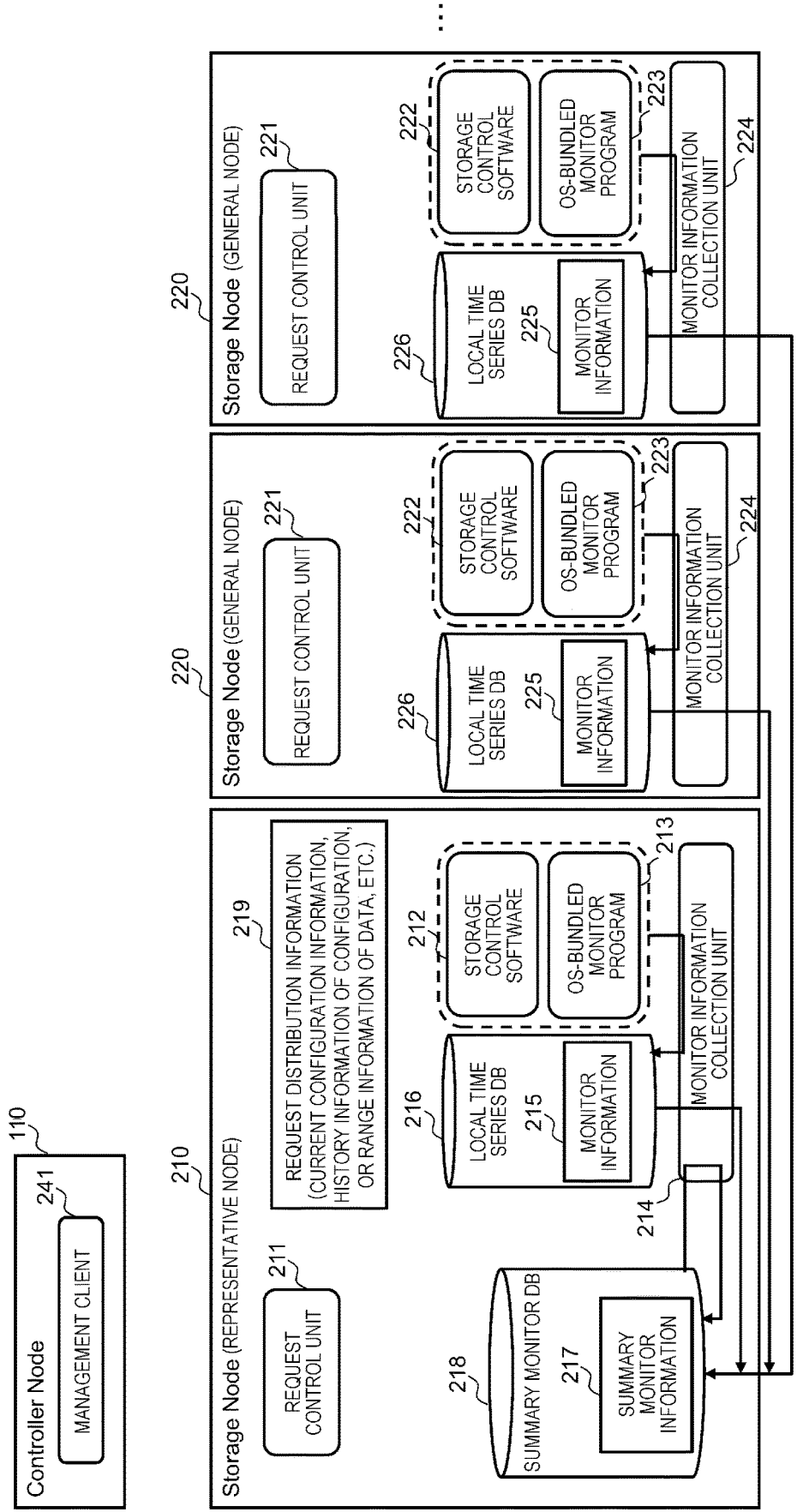
FIG. 2 is a diagram illustrating an example of a configuration related to an operational information collection process according to the first embodiment.

FIG. 2 is a diagram illustrating an example of a configuration related to an operational information collection process in the storage system 1. FIG. 2 illustrates storage nodes 210 and 220 as the storage nodes 100.

The storage nodes 210 and 220 respectively include request control units 211 and 221, storage control software 212 and 222, OS-bundled monitor programs 213 and 223, and monitor information collection units 214 and 224. The storage nodes 210 and 220 respectively include local time series DB 216 and 226 that store monitor information 215 and 225 collected by the monitor information collection units 214 and 224.

In addition, when not distinguished from each other, the storage nodes 210 and 220 may be referred to as "storage node 100". When not distinguished from each other, the request control units 211 and 221 may be referred to as "request control unit 201". When not distinguished from each other, the storage control software 212 and the storage control software 222 may be referred to as "storage control software 202". When not distinguished from each other, the OS-bundled monitor programs 213 and 223 may be referred to as "OS-bundled monitor program 203". When not distinguished from each other, the monitor information collection units 214 and 224 may be referred to as "monitor information collection unit 204". When are not distinguished from each other, the monitor information 215 and 225 may be referred to as "monitor information 205". When not distinguished from each other, the local time series DB 216 and 226 may be referred to as "local time series DB 206".

Additionally, although an example in which one storage control software 202 is provided in the storage nodes 100 will be described, there is no limitation in the number and type of the storage control software 202 to be provided and the storage control software 202 may be provided in a plural number or with multiple types. Although an example in which one OS-bundled monitor program 203 is provided in the storage nodes 100 will be described, there is no limitation in the number and type of the OS-bundled monitor programs 203 to be provided and the OS-bundled monitor program 203 may be provided in a plural number or with multiple types.

The request control unit 201 receives a request from the controller node 110 and the like. The storage control software 202, for example, is basic software installed at a storage controller and acquires operational information (for example, the monitor information 205) indicating an operational status of the storage node 100. The OS-bundled monitor program 203, for example, is a program subordinate to an operating system (OS) of the storage node 100 and acquires the operational information (for example, the monitor information 205) indicating the operational status of the storage node 100. The monitor information collection unit 204 collects the operational information (for example, the monitor information 205) from the storage control software 202 and the OS-bundled monitor program 203.

The monitor information 205 is information indicating an operational status of resources (physical resources and/or logical resources) constituting the storage node 100 such as capacity information (for example, capacity), performance information (for example, input/output per second (IOPS)), and failure symptom information (for example, self-monitoring analysis and reporting technology (SMART) information of a solid state drive (SSD) life and the like. The monitor information 205 may be a counter value (for example, an IO count) or an instantaneous value (for example, IOPS). Furthermore, when the monitor information 205 is the counter value, the monitor information 205 may be converted into the instantaneous value when it is stored in the local time series DB 206.

In the embodiment, as illustrated in FIG. 2, the storage node 210 is a representative node that receives a request from the controller node 110. The storage node 210 serving as the representative node further includes a summary monitor DB 218 that stores summary monitor information 217, and request distribution information 219. Hereinafter, the storage node 210 is appropriately referred to as a "representative node" and the storage node 220, which is not the representative node, is appropriately referred to as a "general node". In addition, as a communication network between each general node and the representative node, any one of the frontend network 130 and the backend network 140 may be used.

In addition, the representative node includes a plurality of resources, stores resource status information (for example, the monitor information 205 and operational information) indicating the status of each of the plurality of resources in a first storage unit (for example, the local time series DB 216), and stores resource status information collected from the plurality of general nodes and the first storage unit of the representative node in a second storage unit (for example, the summary monitor DB 218); however, the invention is not limited thereto. For example, the representative node may be a dedicated storage node having the summary monitor DB 218 and the request distribution information 219 without having the local time series DB 216. Furthermore, two or more representative nodes may exist. When two or more representative nodes exist, the request distribution information 219 and the summary monitor information 217 of the summary monitor DB 218 may be copied between the representative nodes to retain duplication, or may be retained in a distributed manner.

Furthermore, for the request control unit 201, the same program or different programs may be used for the representative node and the general node. For the monitor information collection unit 204, the same program or different programs may be used for the representative node and the general node.

The summary monitor information 217 is aggregate information (summarized resource status information) that is information obtained by aggregating operational information. For example, the summary monitor information 217 is information that is relatively frequently used on a daily basis, and is information in which the monitor information 205 has been summarized in a time direction (for example, information 60 counts per second have been aggregated into information per minute), or information summarized by aggregating the monitor information 205 of a plurality of general nodes (for example, all volumes of one node has been aggregated as one resource).

The summary monitor information 217 may be regularly transmitted from the general node and may be collected or may be collected by the monitor information collection unit 214 of the representative node by inquiring of each general node as will be described later. When the monitor information collection unit 214 of the representative node inquires of each general node, it may be passed through the request control unit 221 or the monitor information collection unit 224 of each general node or it may directly inquire of the local time series DB 226.

In the embodiment, a configuration example in which the representative node stores the summary monitor information 217 has been described; however, the invention is not limited thereto. For example, the representative node may be configured to store the monitor information 225 (resource status information) collected from the general nodes instead of the summary monitor information 217. In such a configuration, the frequency at which the general node acquires resource status information from each resource may be higher than the frequency at which the representative node acquires the resource status information from the general node, and the capacity of the resource status information acquired from each resource by the general node may be larger than the capacity of the resource status information acquired from the general node by the representative node.

The request distribution information 219 includes current configuration information, history information indicating the past movement history of resources (indicating that the resources have been provided to any general node), range information indicating a range of the storage node 100 in which operational information can be distributed (indicating a range of the general node in which resources can be moved), and the like. Additionally, the history information is information indicating history regarding a storage nodes 100 in which resources have existed. For example, since the history information includes time information, the history information may be information capable of identifying the times at which resources have existed in any storage nodes 100.

<Operational Information Collection Procedure>

With reference to FIG. 2, a main collection procedure of operational information (the monitor information 205 and the summary monitor information 217) in the storage system 1 will be described.

(Procedure 1)

The monitor information collection unit 204 acquires the operational information from a program or a process group serving as a source of the monitor information 205, and regularly (at a fine time interval in seconds and the like) stores the operational information in the local time series DB 206 as the monitor information 205.

(Procedure 2)

The monitor information collection unit 204 aggregates the monitor information 205 in the time direction or aggregates the monitor information 205 for each resource, and regularly (at a coarse time interval in minutes and the like) stores the aggregated information in the summary monitor DB 218 of the representative node as the summary monitor information 217. The monitor information collection unit 204 aggregates the monitor information 205 as any one of an average value, a sum value, a minimum value, a maximum value, the latest value, and the oldest value. In addition, there is no limitation in the aggregation method of values. For example, as an aggregation method other than the described aggregation method, a calculation and the like of a median value may be employed.

(Procedure 3)

The monitor information collection unit 204 aggregates information based on the summary monitor information 217 collected from all the storage nodes 100, and stores the aggregated information as the summary monitor information 217 of a larger unit (for example, for each storage cluster 150).

As described above, the storage node 100 regularly stores the monitor information 205 (for example, about a second, resources are employed as Key information) of each resource acquired on a non-routine basis (for example, when a problem occurs) in the local time series DB 206.

On the other hand, the storage node 210, which is the representative node, stores the summary monitor information 217 (for example, about a minute, time is employed as Key) acquired on a daily basis (for example, regularly) in the summary monitor DB 218, in addition to the monitor information 205 stored in each storage node 100.

Figure 3:
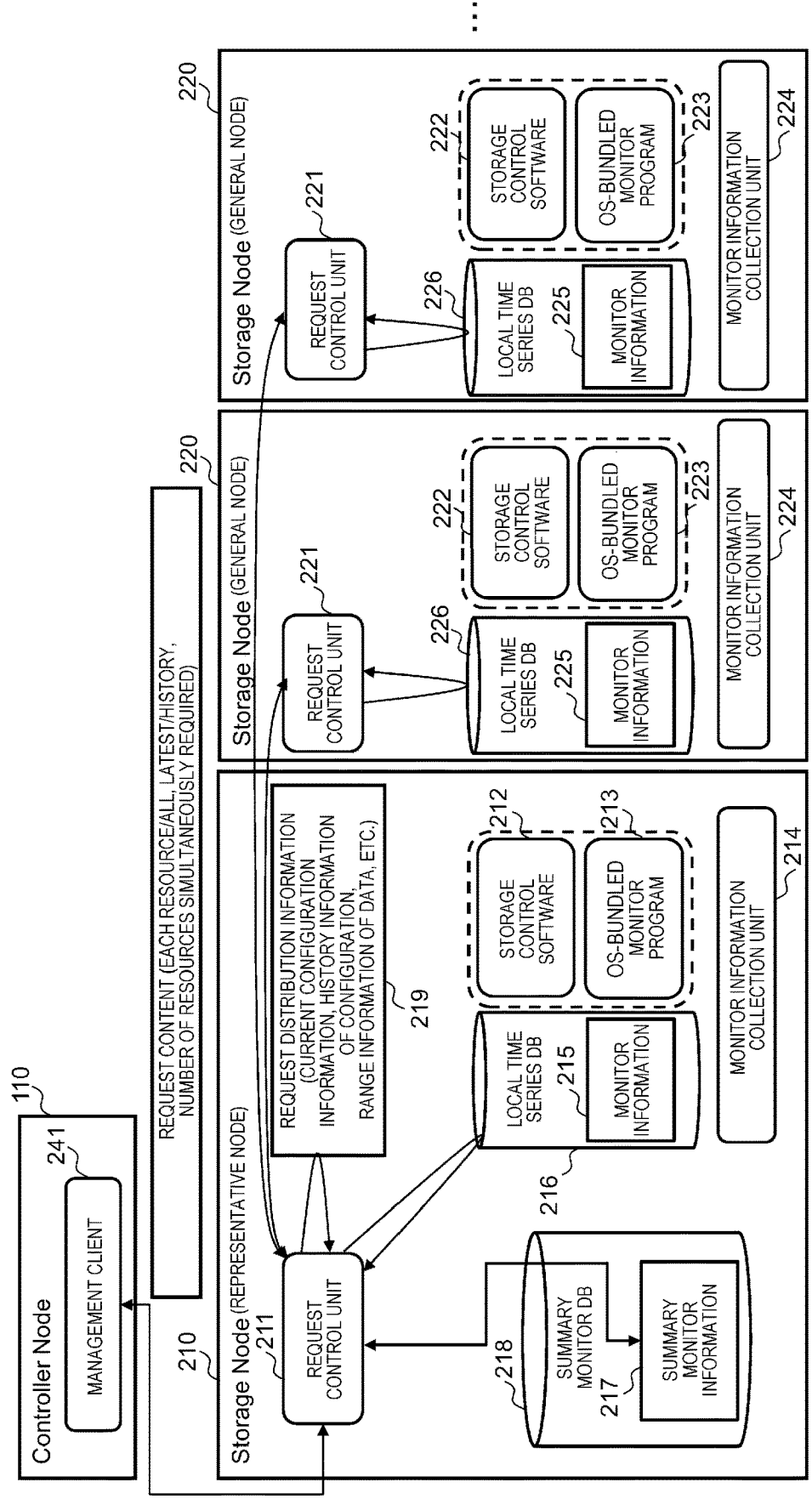
FIG. 3 is a diagram illustrating an example of a configuration related to an operational information reference process according to the first embodiment.

FIG. 3 is a diagram illustrating an example of a configuration related to a reference process of the operational information (the monitor information 205 and the summary monitor information 217) in the storage system 1.

<Operational Information Reference Process>

With reference to FIG. 3, a main reference procedure of the operational information in the storage system 1 will be described.

(Procedure 1)

The request control unit 211 of the representative node receives a request from a management client 241 of the controller node 110.

(Procedure 2)

The request control unit 211 of the representative node acquires the request distribution information 219 required to distribute an acquisition destination of the operational information.

(Procedure 3)

Based on the content of the request and the request distribution information 219, the request control unit 211 of the representative node determines a storage node 100 that makes an inquiry and operational information to be returned. More specifically, based on the content included the request (whether it is operational information of each resource or operational information of all clusters or whether it is the latest operational information of resources or operational information of a predetermined period (history) from 10 o'clock to 11 o'clock, the number of resources required at the same time, and the like) and the request distribution information 219, the request control unit 211 determines operational information (the monitor information 205 or the summary monitor information 217) to be returned and the storage node 100 that inquires the operational information.

(Procedure 4)

The request control unit 211 of the representative node inquires of the storage node 100, which should make an inquiry, about necessary operational information. In addition, the request control unit 211 may send out a query to each storage node 100 at once or send out the query several times.

(Procedure 5)

The necessary operational information is acquired from the summary monitor DB 218 or each storage node 100.

(Procedure 6)

The request control unit 211 of the representative node receives the necessary operational information.

In addition, for communication between the request control units 201, the frontend network 130 may be used or the backend network 140 may be used.

(Procedure 7)

The request control unit 211 of the representative node shapes the collected operational information and returns the shaped operational information to the management client 241.

In the embodiment, the representative node receives a request; however, the invention is not limited thereto and the request control unit 221 of the general node may receive a request and transmit the request to the representative node (communication processing with the controller node 110 and processing related to the collection of the operational information may be distributed). Furthermore, it may be possible to employ a configuration in which a request is transmitted between a plurality of representative nodes having copied request distribution information 219 and summary monitor DB 218 so as to reduce a processing load.

Additionally, since the management client 241 is an example of a management unit that manages the status of resources of the storage node 100, it may exist in the storage node 100 or may exist outside the storage system 1. Furthermore, it may be possible to employ a configuration in which a request for the request control unit 201 is transmitted from an arbitrary program, a process and the like in the storage node 100.

Figure 4:
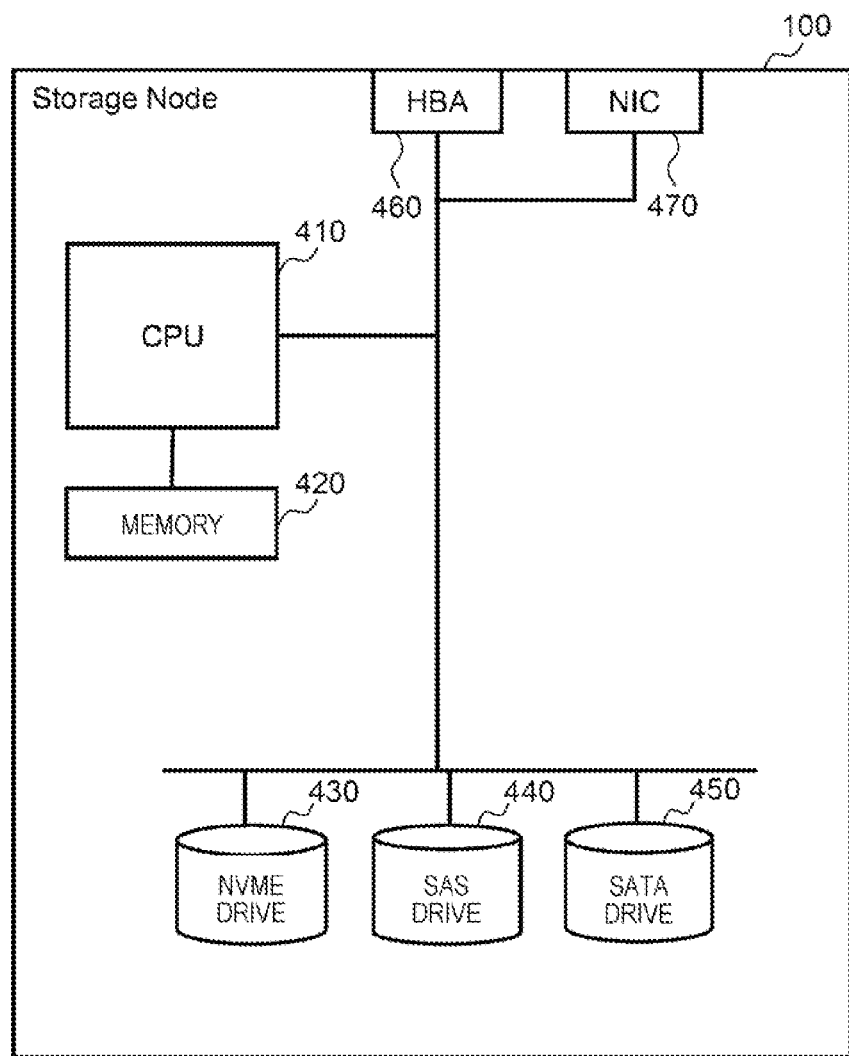
FIG. 4 is a diagram illustrating an example of a configuration related to hardware resources of a storage node according to the first embodiment.

FIG. 4 is a diagram illustrating an example of a configuration related to hardware resources of the storage node 100.

The storage node 100 is a general-purpose computer (for example, a server device). The storage node 100 includes a central processing unit (CPU) 410, a memory 420, a plurality of drives (non-volatile memory express (NVMe) drives 430, a serial attached SCSI (SAS) drive 440, a serial advanced technology attachment (SATA) drive 450), a host bus adapter (HBA) 460, and a network interface card (NIC) 470.

In addition, the drive may be a non-volatile memory (storage class memory (SCM)) and the like in addition to a hard disk drive (HDD) and a solid state drive (SSD). The HBA 460, for example, is for the frontend network 130 and is a fibre channel (FC), an Ethernet (registered trademark), an InfiniBand and the like, and is not particularly limited. The NIC 470, for example, is for the backend network 140 and is the FC, the Ethernet, the InfiniBand and the like, and is not particularly limited.

In the storage node 100, an example in which each hardware resource is provided one by one has been described; the number of each hardware resource is not particularly limited and may be one or more than one.

Figure 5:
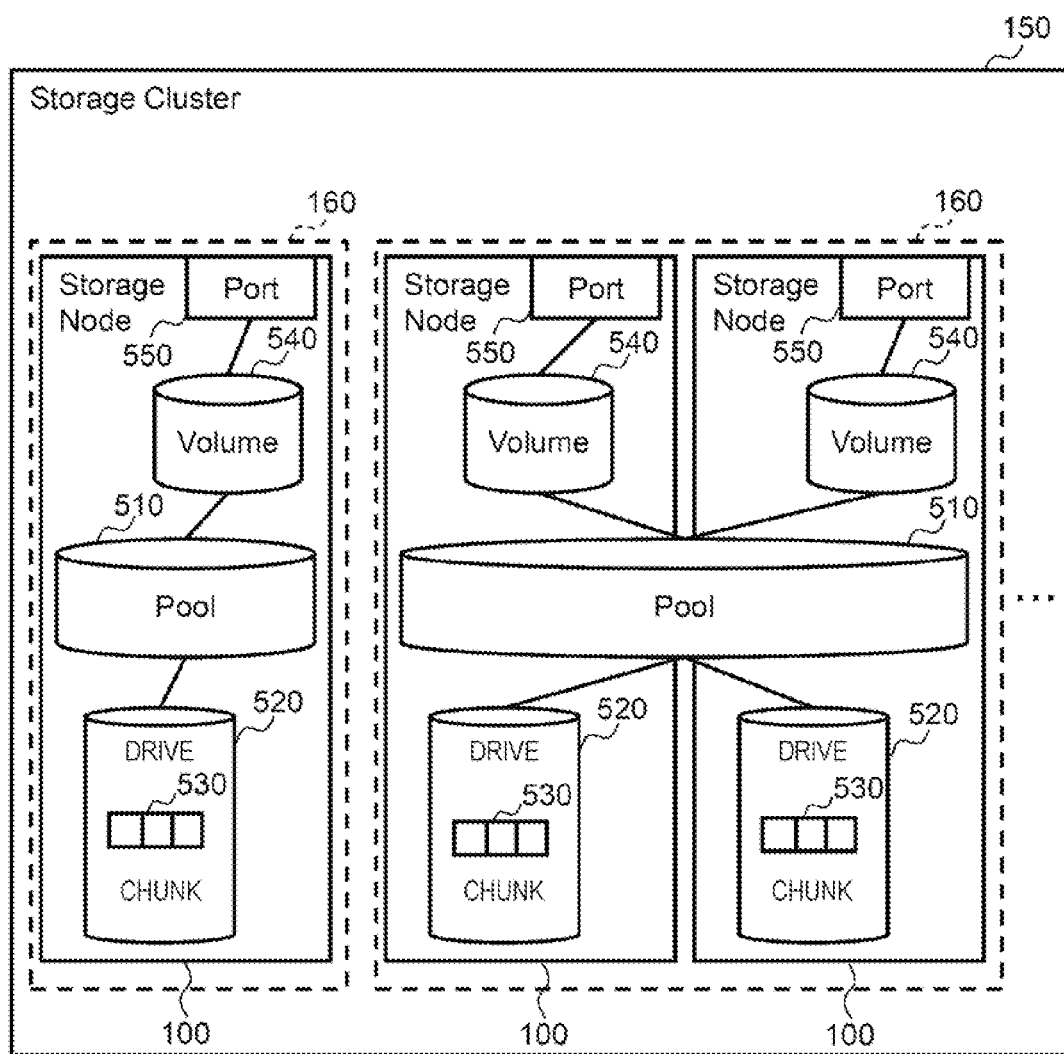
FIG. 5 is a diagram illustrating an example of a logical configuration related to a storage cluster according to the first embodiment.

FIG. 5 is a diagram illustrating an example of a logical configuration related to the storage cluster 150.

The storage cluster 150 includes one or a plurality of protection domains 160, and each protection domain 160 is provided therein with one or more pools 510 (Pool). The pool 510 may be provided across the storage node 100 or may be closed within the storage node 100. Furthermore, in order to facilitate management, the pool 510 may have a hierarchical structure. As an example of the hierarchical structure, one or more pools 510 closed within the storage node 100 may be combined with each other, one or more of the pool 510 provided across the storage node 100 and the pool 510 closed within the storage node 100 may be combined with each other, or other configurations may be employed.

A physical storage area of the pool 510 is allocated from one or more drives 520 or one or more chunks 530 (obtained by dividing a physical storage area of the drive 520) in the same protection domain 160.

A volume 540 is curved from the pool 510. The volume 540 may be closed within the storage node 100 or may be provided across the storage node 100.

In addition, one or more drives 520 or one or more chunks 530 may be directly allocated to the volume 540 without defining the pool 510.

A relation between a port 550 and the volume 540 may be any one of many-to-many, many-to-one, one-to-many, and one-to-one. Furthermore, these relations may be across the storage node 100 or may be closed within the storage node 100. In addition, these relations are managed by the storage control software 202 and the configuration information.

The operational information collection process and reference process of the storage node 100 are not limited to the above-described storage configuration (not only a specific storage configuration), and can be applied to an arbitrary storage configuration. For example, the collection process and the reference process can be applied to a configuration in which no protection domain 160 is defined, and can also be applied to a configuration in which no pool 510 is provided. Furthermore, the collection process and the reference process can be applied to a configuration in which a virtual group for expressing redundant arrays of inexpensive disks (RAID) level is interposed between the pool 510 and the drive 520.

Figure 6:
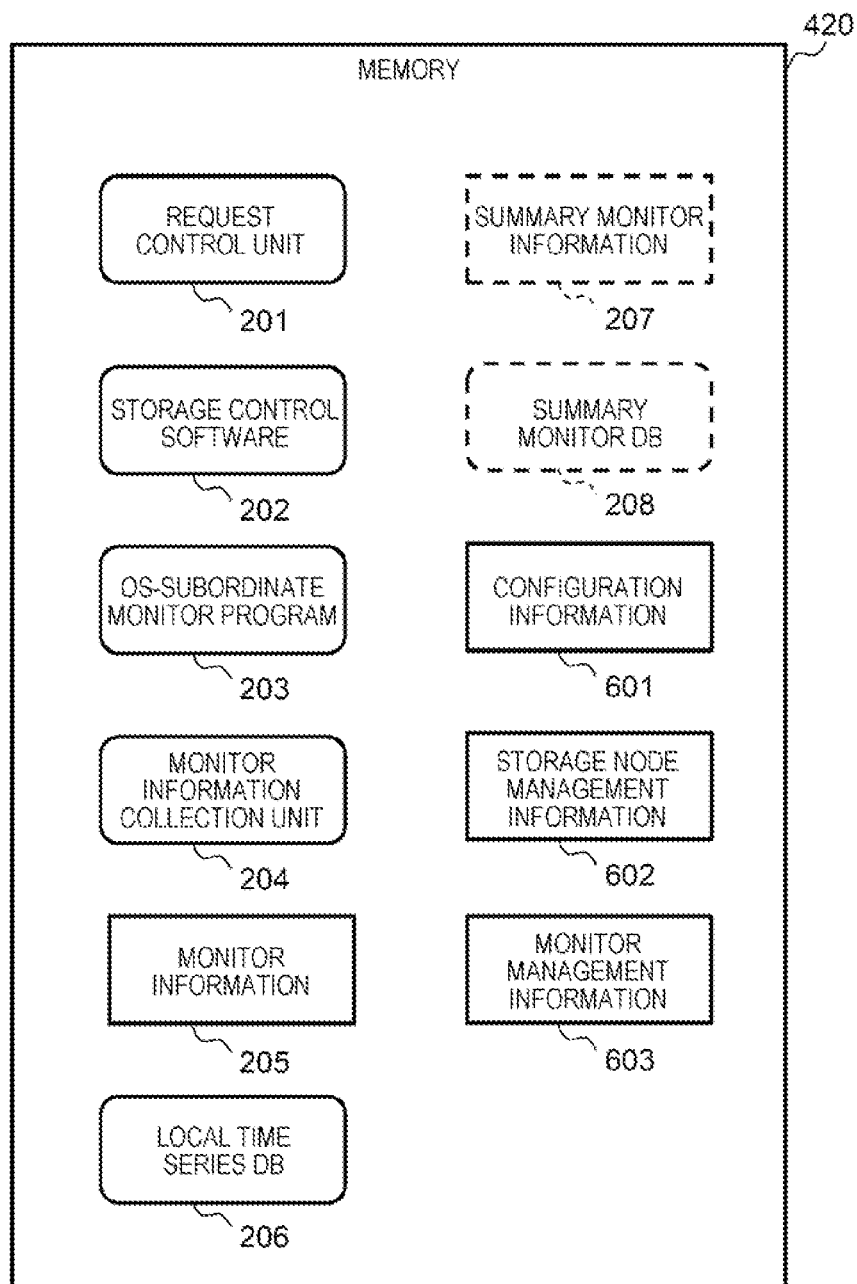
FIG. 6 is a diagram illustrating an example of data stored in a memory according to the first embodiment.

FIG. 6 is a diagram illustrating an example of data stored in the memory 420.

The request control unit 201 receives a request from the controller node 110, acquires operational information requested by the request from its own storage node 100 or another storage node 100, and transmits the acquired operational information to the controller node 110.

The storage control software 202 is a program group that performs functions of setting of configuration information 601, monitoring of a resource utilization rate and the like, virtualization of a storage device, and the like. The storage control software 202 includes a frontend driver for providing an interface with an exterior, a controller driver for managing I/O to a volume and the like, a backend driver for providing an interface with a cache and a drive (a physical disk), and the like. More specifically, the storage control software 202 monitors the pool 510, the drive 520, the volume 540, the port 550 and the like, and manages information (IOPS, a transfer rate and the like) on which the monitor information 205 is based.

The OS-bundled monitor program 203 acquires information (a utilization rate of the CPU 410, a utilization rate of the memory 420, and the like), on which the monitor information 205 is based, by a top command, a sar command and the like.

One monitor information collection unit 204 may be provided, or one or more monitor information collection units may be provided to each program, each process, or each resource to be collected.

The configuration information 601 includes information to be used to distribute the acquisition destination of the operational information. The configuration information 601 will be described later using FIG. 7. Storage node management information 602 includes information to be used to manage the storage node 100. The storage node management information 602 will be described later using FIG. 8. Monitor management information 603 includes information to be used to collect the operational information. The monitor management information 603 will be described later using FIG. 9.

In addition, it may be possible to employ a configuration in which the monitor information 205, the local time series DB 206, summary monitor information 207, a summary monitor DB 208, the configuration information 601, the storage node management information 602, and the monitor management information 603 are stored in the drive 520 instead of the memory 420.

In the embodiment, only the representative node has the summary monitor information 207 and the summary monitor DB 208. In addition, the summary monitor information 207 may be duplicated between the representative nodes or may be retained in a distributed manner. Each storage node 100 or only the representative node may have the configuration information 601 and the storage node management information 602.

The functions (the request control unit 201, the storage control software 202, the OS-bundled monitor program 203, the monitor information collection unit 204, the local time series DB 206, the summary monitor DB 208 and the like) of the storage node 100, for example, may be performed when the CPU 410 reads a program to the memory 420 and executes the read program (software), may be performed by hardware such as a dedicated circuit, or may be performed by a combination of the software and the hardware. Furthermore, some of the functions of the storage node 100 may be performed by another computer capable of communicating with the storage node 100.

With reference to FIGS. 7 to 11, various types of information (tables) used in the storage system 1 will be described. In addition, it may be configured to retain values in other formats, such as a description format such as Javascript (registered trademark) object notation (JSON), instead of a table format.

FIG. 7 is a diagram illustrating an example (a configuration information table) of the configuration information 601. The configuration information table is provided for each resource type. In addition, even in the same resource type, separate tables may be used for each different resource identification (ID). Additionally, when a separate table is used for each resource ID, the resource ID of the table is not required. FIG. 7 illustrates a configuration information table 701 of the volume 540, a configuration information table 702 of the pool 510, and a configuration information table 703 of the chunk 530 as the configuration information table, and does not illustrate configuration information tables of other resources.

The configuration information table stores information of resources for constructing the storage node 100, related information of the resources, and history information indicating the movement history of the resources.

As the resources, there are the storage cluster 150, the pool 510, the drive 520, the chunk 530 in the drive 520, which allocates a physical storage area to the pool 510 or the volume 540, the volume 540, the port 550, a bus among the compute node 120 (a host), the port 550, and the volume 540, and the like.

For example, in the configuration information table 701 of the volume 540, resource information (information of a resource ID, a capacity, and a name), resource-related information (information of a protection domain (PD) ID, a Pool ID, and a Node ID), and history information (movement history) are stored in a correlated manner.

The resource ID indicates an identifier capable of identifying the volume 540. Hereinafter, all identifiers may be numerals, character strings, or a combination of the numerals and the character strings. The capacity indicates a capacity allocated to the volume 540. The name indicates a name set in the volume 540.

The PDID indicates an identifier capable of identifying the protection domain 160 including the volume 540. In addition, the protection domain 160 is a logical partition with a plurality of storage nodes 100 and indicates a range in which data (operational information) may be distributed. The PDID is set by a user at the time of initial environment construction.

The Pool ID indicates an identifier capable of identifying the pool 510 from which the volume 540 has been curved. The Node ID indicates an identifier capable of identifying the storage node 100 provided with the volume 540.

The movement history indicates the storage node 100 provided with the volume 540 moved in the past. In addition, the movement history may be retained as one column in the table or may be retained as a separate configuration information table for each time. Furthermore, the movement history is updated when a movement of the volume 540 in the storage node 100 occurs or a movement occurs due to failover and the like.

Similar to the configuration information table 701 of the volume 540, in the configuration information table 702 of the pool 510, for example, information such as resource information (information such as a resource ID, a capacity, and a name), resource-related information (for example, a PDID) and the like are stored in a correlated manner. Furthermore, for example, in the configuration information table 703 of the chunk 530, information such as resource information (information such as a resource ID, a capacity and the like), resource-related information (information such as a PDID and a related pool ID) and the like are stored in a correlated manner.

Figure 8:
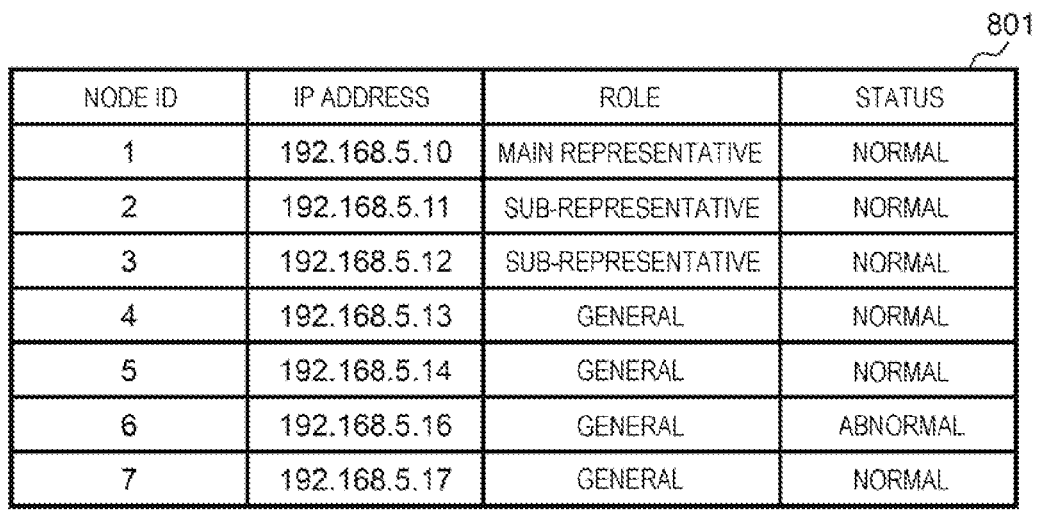
FIG. 8 is a diagram illustrating an example of storage node management information according to the first embodiment.

FIG. 8 is a diagram illustrating an example (a storage node management information table 801) of the storage node management information 602. In the storage node management information table 801, information of a node ID, an Internet protocol (IP) address, a role, and a status is stored in a correlated manner.

The node ID indicates an identifier capable of identifying the storage node 100.

The IP address is an example of identification information allocated to the storage node 100 used for communication. The IP address may be an Internet protocol version 4 (IPv4) or an Internet protocol version 6 (IPv6). Furthermore, instead of the IP address, a world wide name (WWN) for communicating with FC may be used or identification information used for communication in other protocols may be used.

The role indicates the role of the storage node 100. As the role, there may be distinction between a main representative node of representative nodes, which representatively controls a request from the management client 241, and a sub-representative node that is not the main representative node, or a plurality of representative nodes may have the same role (any representative node may control a request). In addition, the role is decided at the time of initial environment construction, but may be changed when one of sub-representative nodes is promoted to the main representative node by majority, an ID order and the like when a failure occurs in the main representative node. Additionally, when the main representative node is selected by the logic of majority, it is preferable that the number of representative nodes is an odd number.

The status indicates a status (normal or abnormal) when the storage node 100 is normally operating.

FIG. 9 is a diagram illustrating an example (a monitor management information table 901) of the monitor management information 603. In the monitor management information table 901, information of a monitor information type, a resource type, a metric, a collection cycle, a configuration condition, and a retention period is stored in a correlated manner. The monitor management information table 901 may be commonly provided to all clusters or may be provided for each storage node 100.

The monitor information type indicates the type of operational information (the monitor information 205 "details" or the summary monitor information 207 "summary"). The resource type indicates the type of resources. The metric indicates an indicator for evaluating the status of resources (for example, an operational status). One or a plurality of metrics or an arbitrary metric may be set for each resource.

The collection cycle indicates a cycle at which data of the metric (a metric value) is collected. The collection cycle may be fixed or variable. When the collection cycle is variable, the collection cycle is appropriately changed by a user or a program. In addition, for example, the collection cycle is made empty, so that the metric value may not be collected. Furthermore, the collection cycle may be configured to be set in units of the resource type, set in units of the metric, set for each set obtained by a combination of a plurality of metrics, or set in units of the configuration condition.

The configuration condition indicates a condition provided according to the configuration of the storage system 1. FIG. 9 illustrates an example of setting a configuration condition in which the number (an example of an indicator) of volumes 540 provided in the storage system 1 is equal to or less than 100 and is equal to or more than 101.

The configuration condition may be defined with one indicator or a combination of a plurality of indicators. Furthermore, the configuration condition may not be provided. Furthermore, the configuration condition may be configured to beset in units of the resource type, set in units of the metric, or set for each set obtained by a combination of a plurality of metrics.

The retention period indicates a period for which data of collected metrics is retained. For example, a storage period (a period for which the above-described representative node retains the history of the resource status information) of the summary monitor information 207 is longer than a storage period (a period for which the above-described general node retains the history of the resource status information) of the monitor information 205. The retention period may be fixed or variable. When the retention period is variable, the retention period is appropriately changed by a user or a program. Furthermore, the retention period may be configured to be set in units of the resource type, set in units of the metric, set for each set obtained by a combination of a plurality of metrics, or set in units of the configuration condition.

When being retained for a certain period by such a retention period, the monitor information 205 is deleted by the monitor information collection unit 204. Similarly, when being retained for a certain period, the summary monitor information 217 is deleted by the monitor information collection unit 214.

A method for changing the monitor management information 603 is not particularly limited. For example, there may be a method for updating the monitor management information 603 from the management client 241 via the request control unit 201, a method for updating the monitor management information 603 by reading a setting file, or other methods.

FIG. 10 is a diagram illustrating an example (a monitor information table) of the monitor information 205. An example, in which the monitor information table is provided for each resource type, will be described; however, the invention is not limited thereto and the monitor information table may be provided for each resource. FIG. 10 illustrates a monitor information table 1001 of the volume 540 and a monitor information table 1002 of the pool 510 as the monitor information table, and does not illustrate a monitor information table of other resources.

In the monitor information table, information of a resource ID, a time, and a metric is stored in a correlated manner.

The resource ID indicates an identifier capable of identifying resources. In the time, a value (the time of the storage node 100) is set according to the collection cycle of the monitor management information 603. In the metric, a metric value set in the monitor management information 603 is basically set. However, the metric may be added or deleted. When the metric is added, past information, for example, is made empty.

For example, in the monitor information table 1001 of the volume 540, information of a resource ID, a time, and a metric (IOPS, a transfer rate and the like) is stored in a correlated manner. Furthermore, in the monitor information table 1002 of the pool 510, information of a resource ID, a time, and a metric (an amount used, a compression rate and the like) is stored in a correlated manner.

Figure 11:
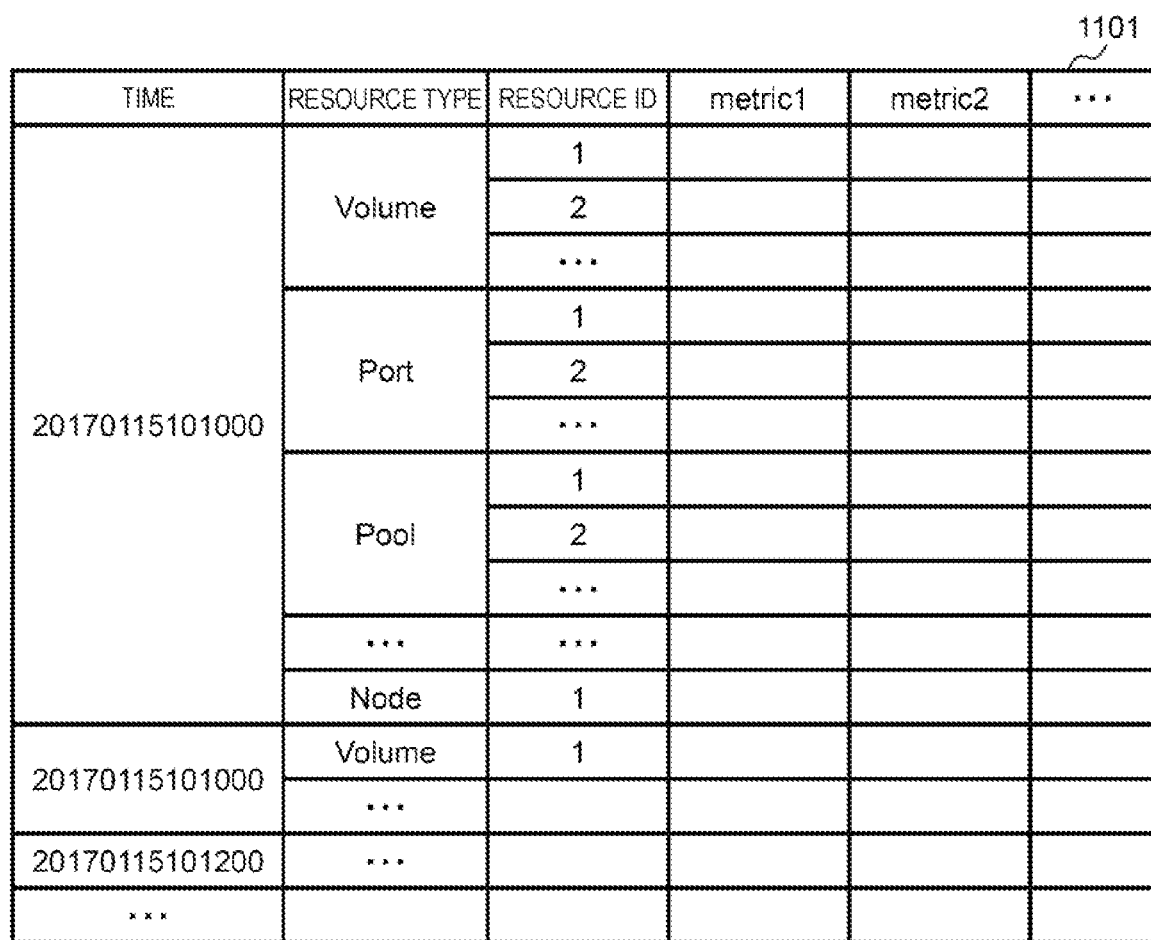
FIG. 11 is a diagram illustrating an example of summary monitor information according to the first embodiment.

FIG. 11 is a diagram illustrating an example (a summary monitor information table 1101) of the summary monitor information 207. FIG. 11 illustrates an example in which the summary monitor information table 1101 is provided for each storage node 100, but may be provided for each cluster without being limited thereto. Furthermore, in order to efficiently use a memory use area, a separate table may be used for each resource.

In the summary monitor information table 1101, the summary monitor information 207 received from the general node and entire information (information in which the summary monitor information 207 has been aggregated for each resource type in unity of the storage node 100, the storage cluster 150 and the like) are stored. For example, for the entire information, when there are 100 volumes 540 in one storage node 100, aggregate values (a sum value, an average value, a maximum value, a minimum value, the latest value, the oldest value and the like) of 100 volumes 540 may be retained as one metric.

In the embodiment, a case where the time of the representative node is set as a key in order to facilitate the acquisition of entire information of the identical time will be described as an example. More specifically, the representative node stores a time (a time stamp) at 1-minute intervals, and stores the summary monitor information 207 received from the general node within one minute in the summary monitor information 207 as the summary monitor information 207 of the identical time. In such a case, the summary monitor information 207 is aggregated for each time and is stored as entire information. In addition, the invention is not limited to the above-described configuration, and the representative node may be configured to store the summary monitor information 207 received from the general node as is and to specify and aggregate the summary monitor information 207 of a time specified by the request when entire information is requested by the request.

In the time, a value (the time of the representative node) is set according to the collection cycle of the monitor management information 603. For a metric with along collection cycle, the same value as the previous cycle may be set.

In addition, when the resource ID is unique among different resource types, the resource type may not be provided.

With reference to FIGS. 12 to 16, various processes in the storage system 1 will be described.

Figure 12:
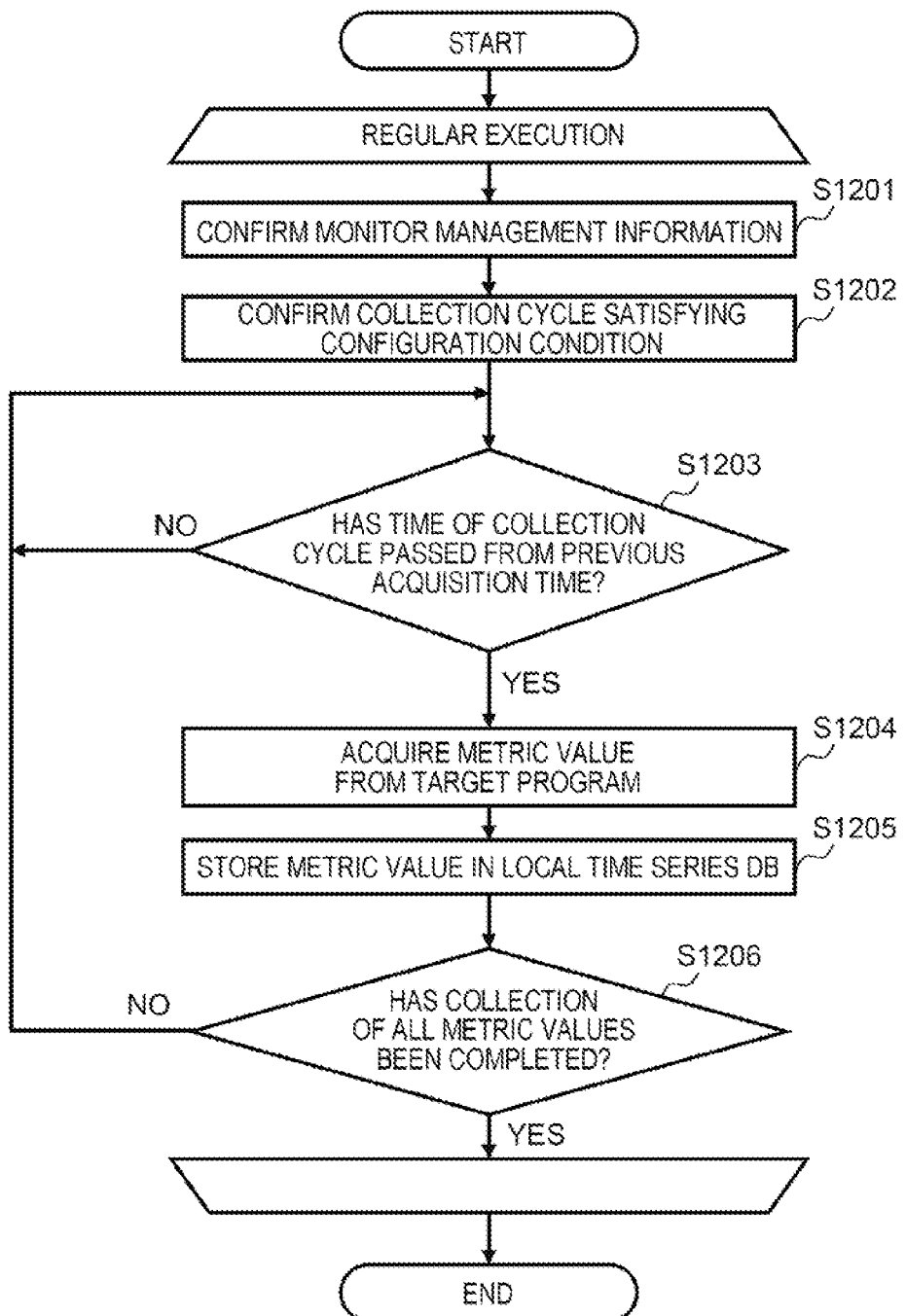
FIG. 12 is a diagram illustrating an example of a procedure related to a monitor information collection process according to the first embodiment.

FIG. 12 is a diagram illustrating an example of a procedure related to the monitor information collection process. Hereinafter, an example in which the monitor information collection process is regularly performed will be described; however, the invention is not limited thereto and for example, the monitor information collection process may be performed at a designated time or at other timings.

In step S1201, the monitor information collection unit 204 confirms (refers to) the monitor management information 603.

In step S1202, the monitor information collection unit 204 confirms a collection cycle satisfying the configuration condition of the monitor management information 603.

In step S1203, the monitor information collection unit 204 determines whether the time of the collection cycle has passed from a previous acquisition time with respect to a metric (a specific metric) of the confirmed collection cycle. When it is determined that the time of the collection cycle has passed, the monitor information collection unit 204 moves the procedure to step S1204. When it is determined that the time of the collection cycle has not passed, the monitor information collection unit 204 performs the process of step S1203.

In step S1204, the monitor information collection unit 204 acquires data (a metric value) of the specific metric from a target program (the storage control software 202 or the OS-bundled monitor program 203 in the example of the embodiment). In addition, the target program retains information, which is a source of each monitor information 205, during IO execution. For example, the frontend driver retains ReadIO count and the like.

In step S1205, the monitor information collection unit 204 stores the acquired metric value in the local time series DB 206 as the monitor information 205. In such a case, the monitor information collection unit 204 converts a data format according to necessity. For example, the monitor information collection unit 204 may convert an accumulated value (for example, an IO count) to an instantaneous value (for example, IOPS).

In step S1206, the monitor information collection unit 204 determines whether the collection of metric values of all metrics to be collected has been completed. When it is determined that the collection has been completed, the monitor information collection unit 204 ends the monitor information collection process. When it is determined that the collection has not been completed, the monitor information collection unit 204 moves the procedure to step S1203.

In the processes from the above-described step S1203 to step S1206, a metric value is collected for the metric of the confirmed collection cycle. However, the invention is not limited thereto and for example, records of the monitor management information table 901 may be set to be processed sequentially from the first record thereof, and a metric value of a metric satisfying the collection cycle and the configuration condition may be collected or a metric value may be collected by other configurations. Furthermore, when a regular execution interval is identical to the collection cycle, the processes of step S1202 and step S1203 may be omitted.

Figure 13:
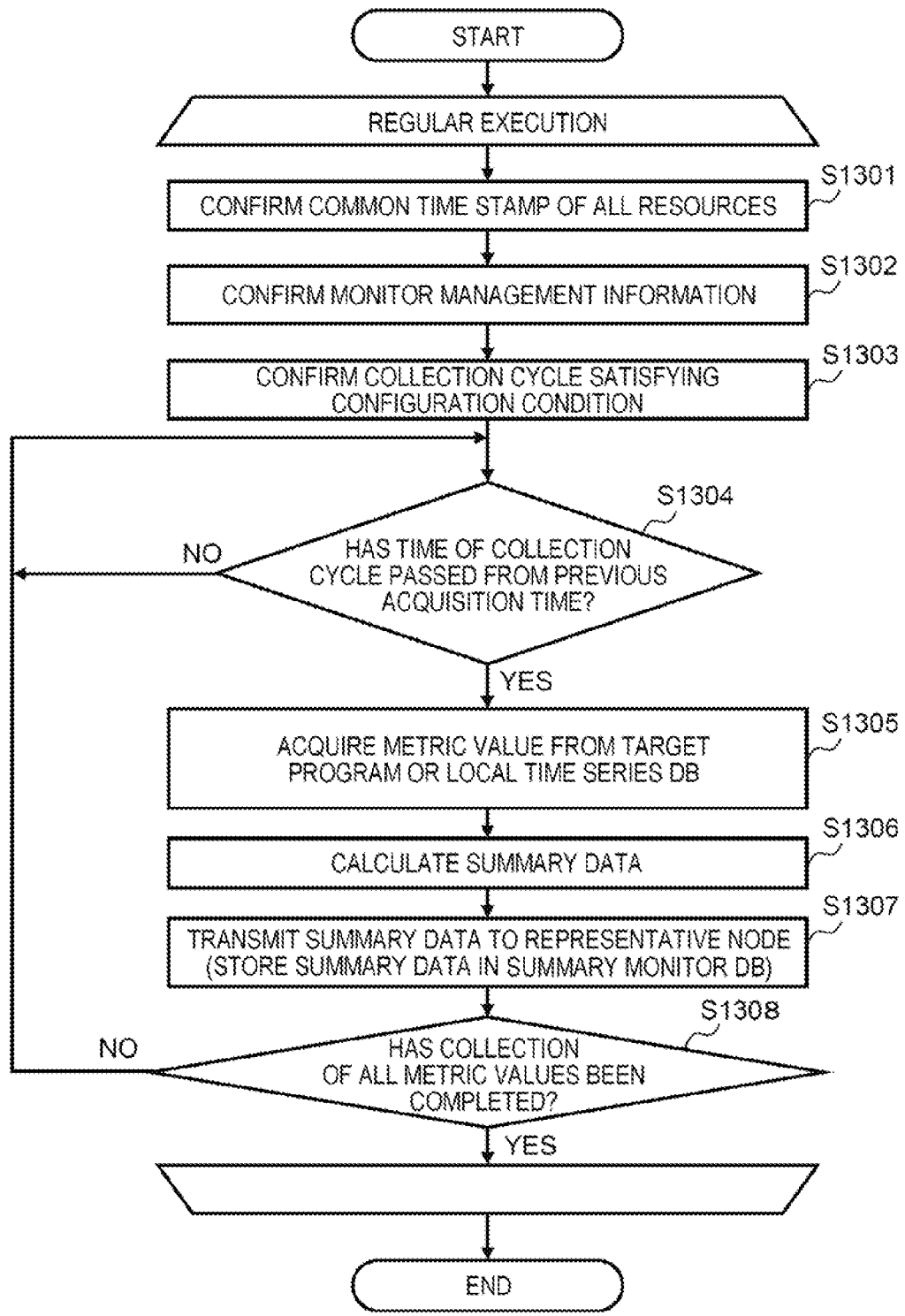
FIG. 13 is a diagram illustrating an example of a procedure related to a first summary monitor information collection process according to the first embodiment.

FIG. 13 is a diagram illustrating an example of a procedure related to a first summary monitor information collection process performed by each storage node 100. Hereinafter, an example in which the first summary monitor information collection process is regularly performed will be described; however, the invention is not limited thereto and for example, the first summary monitor information collection process may be performed at a designated time or at other timings.

In step S1301, the monitor information collection unit 204 confirms a time stamp (for example, a current time of the own storage node 100) common to all resources in the storage node 100.

In step S1302, the monitor information collection unit 204 confirms (refers to) the monitor management information 603.

In step S1303, the monitor information collection unit 204 confirms a collection cycle satisfying the configuration condition of the monitor management information 603.

In step S1304, the monitor information collection unit 204 determines whether the time of the collection cycle has passed from a previous acquisition time with respect to a metric (a specific metric) of the confirmed collection cycle. When it is determined that the time of the collection cycle has passed, the monitor information collection unit 204 moves the procedure to step S1305. When it is determined that the time of the collection cycle has not passed, the monitor information collection unit 204 performs the process of step S1304. In addition, the number of metrics to be used in aggregation differs depending on an aggregation object (an aggregation process) and is one or more than one.

In step S1305, the monitor information collection unit 204 acquires a metric value related to the specific metric from a target program or the local time series DB 206. In addition, the acquisition of the metric value is not limited to the process of step S1305, and for example, in calculation of summary data to be described later, when calculating a difference with previous calculation, the monitor information collection unit 204, for example, may store previous data in the memory 420 and use the stored data.

In step S1306, the monitor information collection unit 204 calculates summary data (a sum value and the like) based on the acquired metric value. For example, the monitor information collection unit 204 aggregates data of 60 counts per second into data per minute (an aggregation process of time unit). Furthermore, for example, the monitor information collection unit 204 aggregates metric values of a plurality of resources into a metric value of one resource (an aggregation process of a resource type unit).

In step S1307, when the monitor information collection unit 204 is not provided in the representative node, the monitor information collection unit 204 transmits the aggregated metric value (summary data) to the representative node. When the monitor information collection unit 204 is provided in the representative node, the monitor information collection unit 204 stores the summary data in the summary monitor DB 218 as the summary monitor information 217. Additionally, the monitor information collection unit 204 can recognize the representative node by referring to the storage node management information 602, and the representative node stores the received summary data in the summary monitor DB 218 as the summary monitor information 217.

In step S1308, the monitor information collection unit 204 determines whether the collection of the metric values of all metrics to be collected has been completed. When it is determined that the collection has been completed, the monitor information collection unit 204 ends the first summary monitor information collection process. When it is determined that the collection has not been completed, the monitor information collection unit 204 moves the procedure to step S1304.

In addition, in the first summary monitor information collection process, a case where each storage node 100 regularly transmits summary data has been described as an example; however, the invention is not limited thereto and for example, the general node may be configured to calculate and transmit summary data according to an acquisition request of the representative node. Furthermore, when a regular execution interval is identical to the collection cycle, the processes of step S1303 and step S1304 may be omitted.

Figure 14:
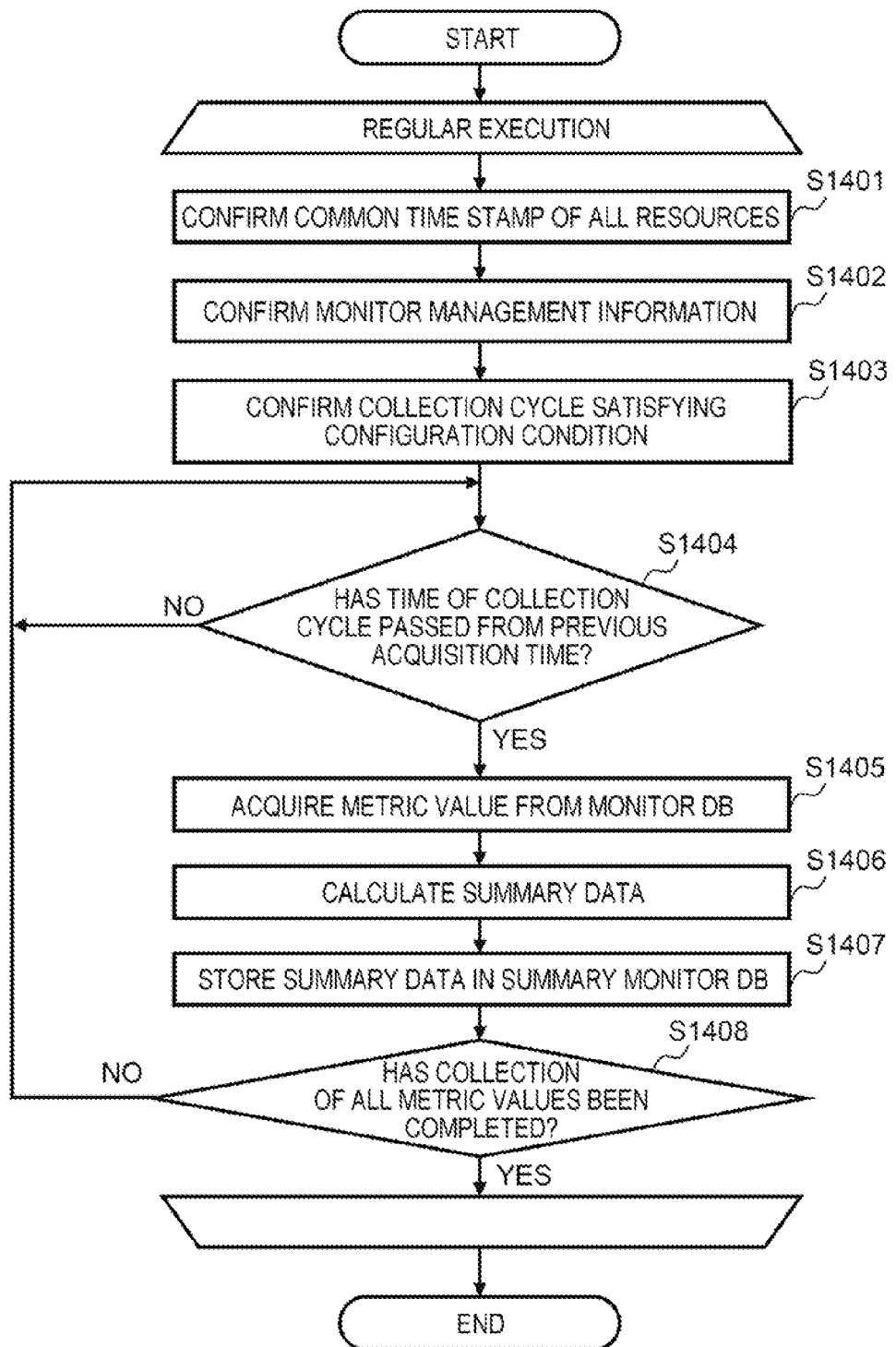
FIG. 14 is a diagram illustrating an example of a procedure related to a second summary monitor information collection process according to the first embodiment.

FIG. 14 is a diagram illustrating an example of a procedure related to a second summary monitor information collection process performed by the representative node (the storage node 210). Hereinafter, an example in which the second summary monitor information collection process is regularly performed will be described; however, the invention is not limited thereto and for example, the second summary monitor information collection process may be performed at a designated time or at other timings. Furthermore, when a regular execution interval is identical to the collection cycle, processes of step S1403 and step S1404 may be omitted.

In step S1401, the monitor information collection unit 214 confirms a time stamp (for example, a current time of the representative node) common to all resources in the storage system 1.

In step S1402, the monitor information collection unit 214 confirms (refers to) the monitor management information 603.

In step S1403, the monitor information collection unit 214 confirms a collection cycle satisfying the configuration condition of the monitor management information 603.

In step S1404, the monitor information collection unit 214 determines whether the time of the collection cycle has passed from a previous acquisition time with respect to a metric (a specific metric) of the confirmed collection cycle. When it is determined that the time of the collection cycle has passed, the monitor information collection unit 214 moves the procedure to step S1405. When it is determined that the time of the collection cycle has not passed, the monitor information collection unit 214 performs the process of step S1404. In addition, the number of metrics used in aggregation differs depending on an aggregation object (an aggregation process) and is one or more than one.

In step S1405, the monitor information collection unit 214 acquires the summary monitor information 217 (a metric value) related to the specific metric from the summary monitor DB 218. In addition, the acquisition of the metric value is not limited to the process of step S1405, and for example, in calculation of summary data to be described later, when calculating a difference with previous calculation, the monitor information collection unit 214, for example, may store previous data in the memory 420 and use the stored data.

In step S1406, the monitor information collection unit 214 calculates summary data (a sum value and the like) based on the acquired metric value. For example, the monitor information collection unit 214 aggregates data of all the storage nodes 100 belonging to one cluster into data of a cluster unit (an aggregation process of a resource type unit). More specifically, the monitor information collection unit 214 calculates the sum value of the used capacities of the volumes 540 in all the storage nodes 100 belonging to one cluster, or calculates the sum value of the IOPSs of the volumes 540 in all the storage nodes 100 belonging to one cluster.

In step S1407, the monitor information collection unit 214 stores the aggregated metric value (summary data) in the summary monitor DB 218 as the summary monitor information 217.

In step S1408, the monitor information collection unit 214 determines whether the collection of metric values of all metrics to be collected has been completed. When it is determined that the collection has been completed, the monitor information collection unit 214 ends the second summary monitor information collection process. When it is determined that the collection has not been completed, the monitor information collection unit 214 moves the procedure to step S1404.

Figure 15:
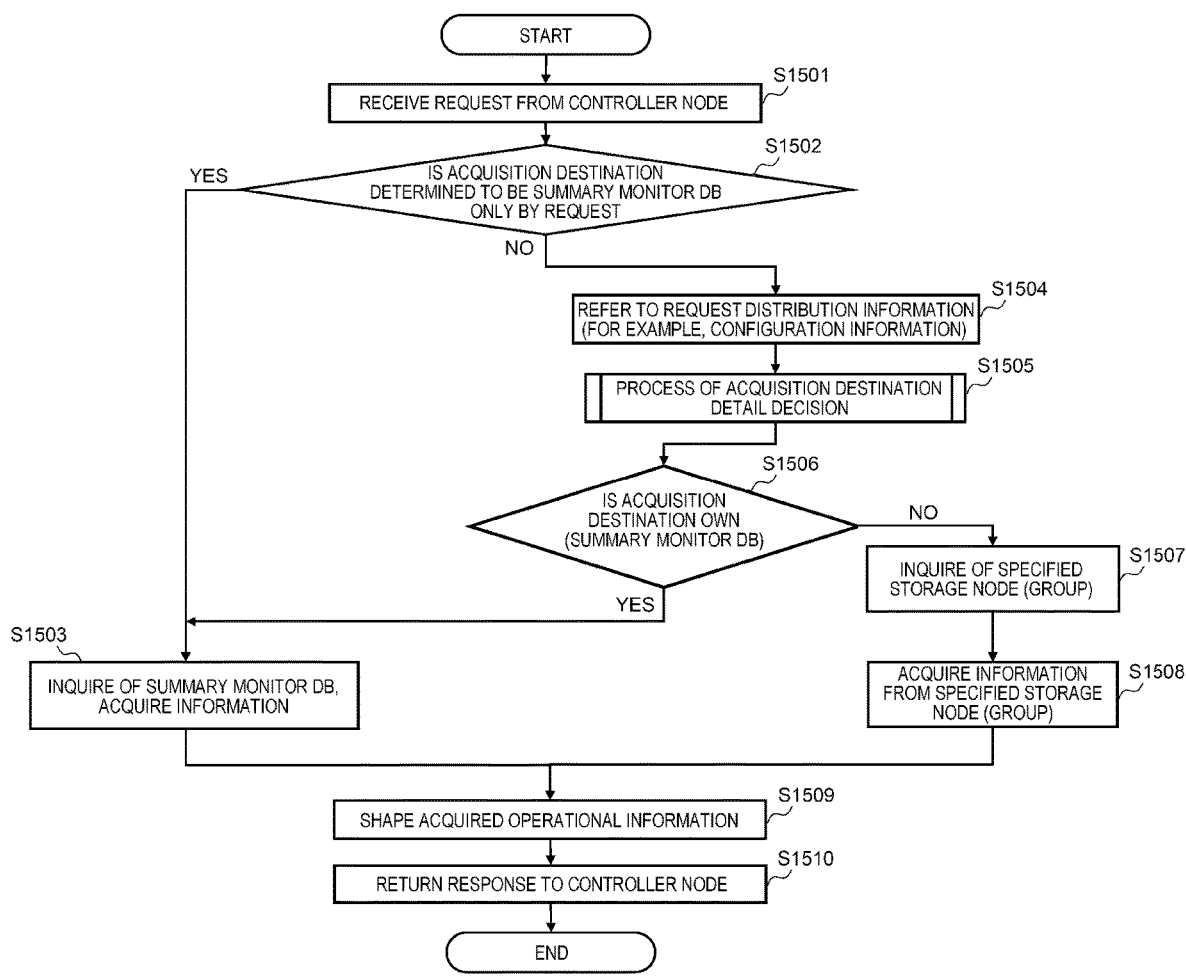
FIG. 15 is a diagram illustrating an example of a procedure related to a request response process according to the first embodiment.

FIG. 15 is a diagram illustrating an example of a procedure related to a request response process performed by the representative node (the storage node 210). The request response process is performed based on the fact that the request control unit 211 of the representative node receives a request from the controller node 110.

In step S1501, the request control unit 211 receives a request from the controller node 110.

In step S1502, the request control unit 211 determines whether an acquisition destination of operational information is the summary monitor DB 218 only by the request. When it can be determined that the acquisition destination of the operational information is the summary monitor DB 218 only by the request, the request control unit 211 moves the procedure to step S1503. When it is not possible to determine that the acquisition destination of the operational information is the summary monitor DB 218 only by the request, the request control unit 211 moves the procedure to step S1504.

For example, when neither time nor resource ID has been designated in the request, the request control unit 211 determines that the latest summary monitor information 217 of all the current resources is requested and determines that the acquisition destination of the operational information is the summary monitor DB 218 only by the request.

Furthermore, for example, when the resource ID has been designated in the request but no time has been designated in the request and when a request object has not been explicitly designated to be the monitor information 205, the request control unit 211 determines that the latest summary monitor information 217 of the current designated resource is requested and determines that the acquisition destination of the operational information is the summary monitor DB 218 only by the request.

In step S1503, the request control unit 211 inquires of the summary monitor DB 218, acquires operational information requested by the request, and moves the procedure to step S1509.

As described above, when it is determined that aggregate information (for example, the summary monitor information 217) stored in the second storage unit (for example, the summary monitor DB 218, the summary monitor information table 1101, the memory 420, or the drive) is requested in the request, the representative node acquires the aggregate information from the second storage unit and transmits the acquired aggregate information to a management unit (for example, the controller node 110, the management client 241, an arbitrary program in the storage node 100, or a process).

In such a case, when the acquired aggregation is information that is relatively high frequently requested from the management unit, it is possible to decide the acquisition destination by analyzing the request without confirming the configuration information 601 according to the above-described configuration, so that it is possible to improve response performance for a request.

More broadly, the representative node determines whether it is possible to acquire resource status information on the above-described request from the above-described second storage unit, and acquires the resource status information from the first storage unit of the above-described general node when it is not possible to acquire the resource status information. According to such a configuration, it is possible to preferentially acquire the resource status information from the second storage unit, so that it is possible to improve response performance for a request.

In step S1504, the request control unit 211 refers to the request distribution information 219 (the configuration information 601 and the like).

In step S1505, the request control unit 211 performs an acquisition destination detail decision process. The acquisition destination detail decision process will be described later with reference to FIG. 16, but in the acquisition destination detail decision process, the storage node 100 of the acquisition destination of the operational information requested by the request is decided.

In step S1506, the request control unit 211 determines whether the acquisition destination of the operational information is the summary monitor DB 218. When it is determined that the acquisition destination of the operational information is the summary monitor DB 218, the request control unit 211 moves the procedure to step S1503. When it is determined that the acquisition destination of the operational information is not the summary monitor DB 218, the request control unit 211 moves the procedure to step S1507.

In step S1507, the request control unit 211 inquires of the request control unit 201 of one or a plurality of storage nodes 100 (decision nodes) decided as the acquisition destination of the operational information about the operational information requested by the request. Upon receipt of the query, the request control unit 201 inquires of the local time series DB 206 about the operational information requested by the request, and transmits the operational information acquired from the local time series DB 206 to the representative node (the request control unit 211).

In step S1508, the request control unit 211 acquires the operational information requested by the request from the decision node and moves the procedure to step S1509.

In step S1509, the request control unit 211 shapes the acquired operational information.

In step S1510, the request control unit 211 transmits the shaped operational information to the controller node 110 having transmitted the request (response return), and ends the request response process.

Figure 16:
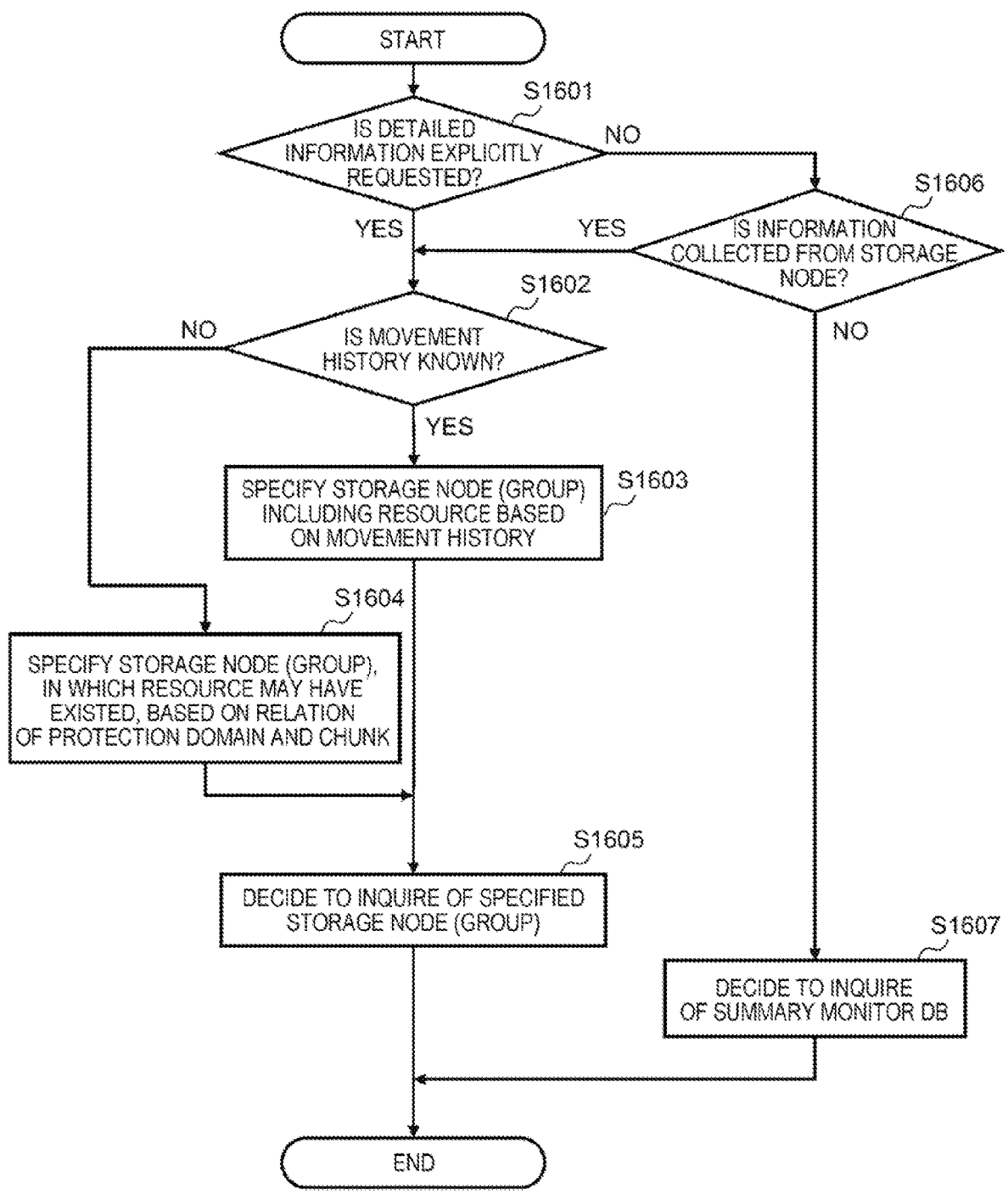
FIG. 16 is a diagram illustrating an example of a procedure related to an acquisition destination detail decision process according to the first embodiment.

FIG. 16 is a diagram illustrating an example of a procedure related to the acquisition destination detail decision process.

In step S1601, the request control unit 211 determines whether detailed information (the monitor information 205) is explicitly requested in a request. When it is determined that the detailed information is explicitly requested, the request control unit 211 moves the procedure to step S1602. When it is determined that the detailed information is not explicitly requested, the request control unit 211 moves the procedure to step S1606.

In step S1602, based on the configuration information 601, the request control unit 211 determines whether a value has been stored in movement history with respect to a designated resource (whether the movement history is known). When it is determined that the value has been stored in the movement history, the request control unit 211 moves the procedure to step S1603. When it is determined that the value has not been stored in the movement history, the request control unit 211 moves the procedure to step S1604.

In step S1603, based on the movement history, the request control unit 211 specifies a storage node 100 (group) in which resources has existed, and moves the procedure to step S1605.

As described above, the representative node analyzes the request, determines whether predetermined resource status information (for example, the monitor information 205) is requested from the management unit, and specifies a general node (a general node retaining requested resource status information) provided with a resource related to the predetermined resource status information based on history information (for example, the movement information of the configuration information 601) when it is determined that the predetermined resource status information is requested. By such specifying, since it is possible to appropriately narrow down acquisition destinations of the resource status information, it is possible to remove a load to the storage node 100 due to an unnecessary query and improve response performance for a request.

In step S1604, based on a relation among the protection domain 160, the chunk 530 and the like, the request control unit 211 specifies a storage node 100 (group) in which resources may have existed, and moves the procedure to step S1605.

As described above, the representative node analyzes the request, determines whether predetermined resource status information (for example, the monitor information 205) is requested from the management unit, and specifies a general node in a range, in which a resource related to the predetermined resource status information can be moved, based on range information (for example, the configuration information 601) when it is determined that the predetermined resource status information is requested. By such specifying, since it is possible to narrow down acquisition destinations of the resource status information to a certain extent, it is possible to reduce a load to the storage node 100 due to an unnecessary query and improve response performance for a request, as compared with a case where the acquisition destinations are not narrowed down.

More broadly, in the case of acquiring the resource status information from the above-described general node, the representative node specifies the above-described general node based on history information indicating any one of the plurality of general nodes, which is provided with a resource that is a target of the resource status information or range information indicating a range in which the above-described resource can be moved, and acquires the resource status information.

In step S1605, the request control unit 211 decides to inquire of the specified storage node 100 (group) and ends the acquisition destination detail decision process.

In step S1606, the request control unit 211 determines whether to acquire operational information from the storage node 100. When it is determined to acquire the operational information from the storage node 100, the request control unit 211 moves the procedure to step S1602. When it is determined not to acquire the operational information from the storage node 100, the request control unit 211 moves the procedure to step S1607.

For example, when the number of resources designated in the request is smaller than a certain number, the request control unit 211 may determine to acquire the operational information from the storage node 100. In such a case, the certain number may differ depending on situations. For example, the certain number may be decided by comparing the counted number of monitor information 205 to be counted with the number of storage nodes 100 that makes an inquiry in terms of a quantity (a ratio), or may be decided by measuring response performance in which time-keyed data is referred to for each resource and comparing the number of storage nodes 100 that makes an inquiry with the response performance.

In addition, since there is a possibility that the volume 540 has been moved among the storage nodes 100 in the past, there are cases where a plurality of storage nodes 100 are inquired with reference to movement information (see step S1603). Furthermore, when it is not possible to retain the movement information due to a memory size problem, even though there is no movement information, a plurality of storage nodes 100 may be inquired such as all storage nodes 100 in the protection domain 160 with potential movement and all storage nodes 100 with a related chunk 530 (see step S1604).

Furthermore, for example, when the number of resources designated in the request is larger than the certain number, the request control unit 211 may determine to acquire the operational information from the summary monitor DB 218.

When the history of the operational information has been designated, it is usual to inquire of each storage node 100, but when more than a certain number of resources are simultaneously designated, reference process efficiency becomes better by referring to the time-keyed summary monitor information 217 of the summary monitor DB 218 provided in the representative node. For example, when a number obtained by counting time of operational information to be acquired is more than 1,000, it may be faster to refer back to the summary monitor information 217 of the summary monitor DB 218 rather than inquiring of 1,000 storage nodes 100 and in such a case, the request control unit 211 determines that it is returned from the summary monitor DB 218.

As described above, based on the number of the above-described general nodes, in which acquisition is performed, when the resource status information is set to be acquired from the above-described general nodes, the above-described representative node decides whether to acquire the resource status information from either the above-described general node or the second storage unit.

In step S1607, the request control unit 211 decides to inquire of the summary monitor DB 218 and ends the acquisition destination detail decision process.

As described above, the representative node analyzes the request, and when it is determined that designation for requesting the resource status information stored in the first storage unit (for example, the local time series DB 206, the monitor information table, the memory 420, and the drive) does not exist in the request, the representative node decides whether to acquire the resource status information from the first storage unit or acquire the aggregate information from the second storage unit based on response performance of the general node. In such a configuration, an object, in which a process required for acquisition is fast, is decided as an acquisition destination, so that it is possible to improve response performance for a request.

In the above-described first embodiment, for example, the storage system is a storage system including a representative node and a plurality of general nodes including a plurality of resources, and the above-described each general node stores resource status information indicating respective statuses of the plurality of resources in a first storage unit thereof and the above-described representative node stores resource status information collected from the plurality of general nodes in a second storage unit thereof, decides whether to acquire the resource status information from the first storage unit of the above-described general node or to acquire the resource status information from the above-described second storage unit based on a received request, and transmits the resource status information acquired from the decided acquisition destination to an issuing source of the above-described request.

In the above-described configuration, the resource status information is retained in the general node, the resource status information collected from the general node is retained in the representative node, and the acquisition destination is changed based on the received request, so that it is possible to reduce a disk capacity necessary for the representative node and to reduce the load of the CPU of the entire storage system.

Furthermore, according to the above-described configuration, for example, even when there is an increase in general nodes to be managed, it is possible to appropriately manage resource status information of each general node.

(2) Second Embodiment

When a storage system becomes large (when the number of storage nodes to be managed is large), if one representative node performs processing at the time of reception of all requests from the controller node, there is a problem that response performance is degraded. In this regard, in the embodiment, a main representative node and a sub-representative node share processing at the time of reception of a request, so that response performance is improved.

The embodiment is mainly different from the first embodiment in that a main representative node and a sub-representative node are provided as representative nodes and the range of a storage node taken charge of by each representative node is specified.

Figure 17:
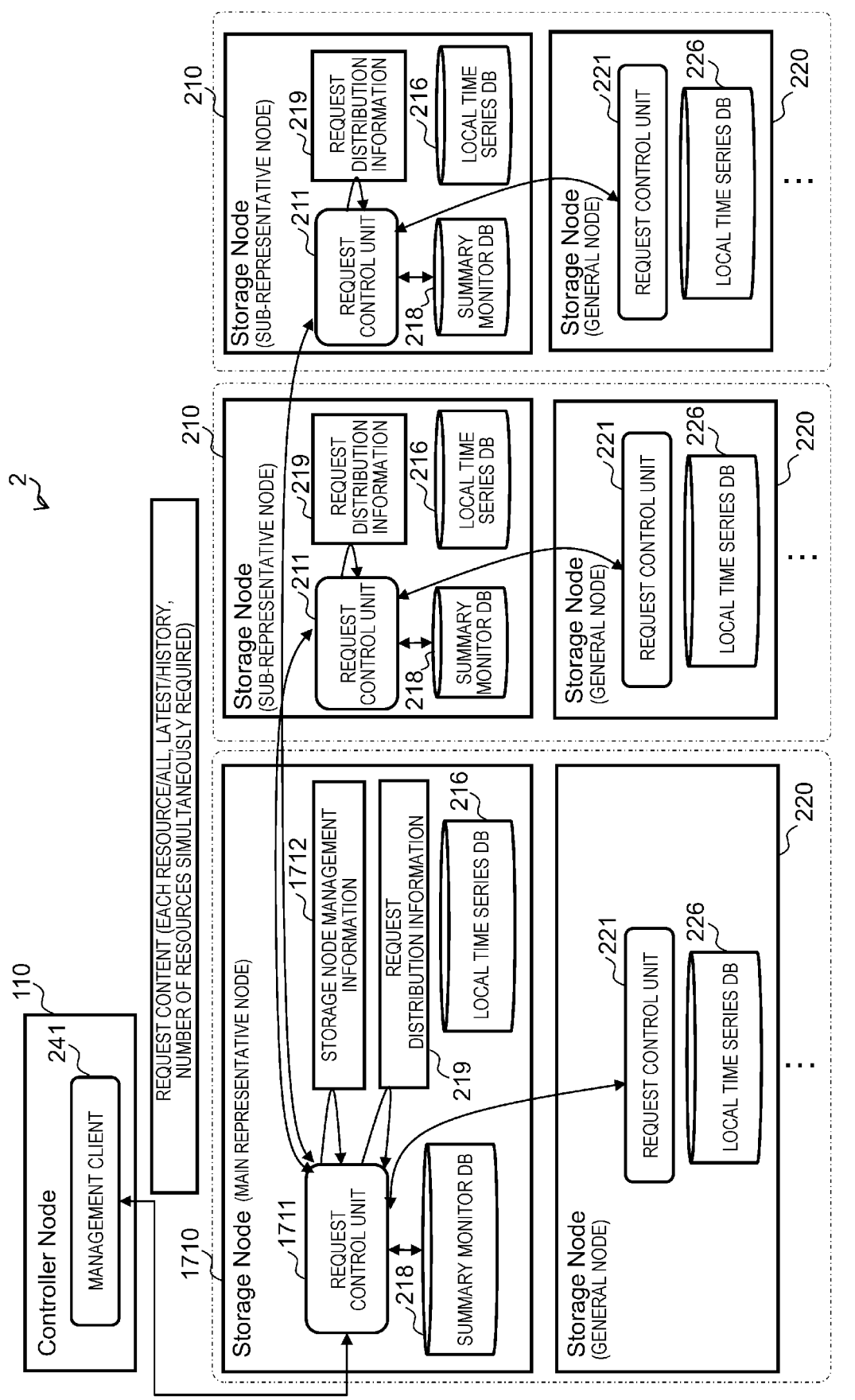
FIG. 17 is a diagram illustrating an example of a configuration related to a storage system according to a second embodiment.
Figure 19:
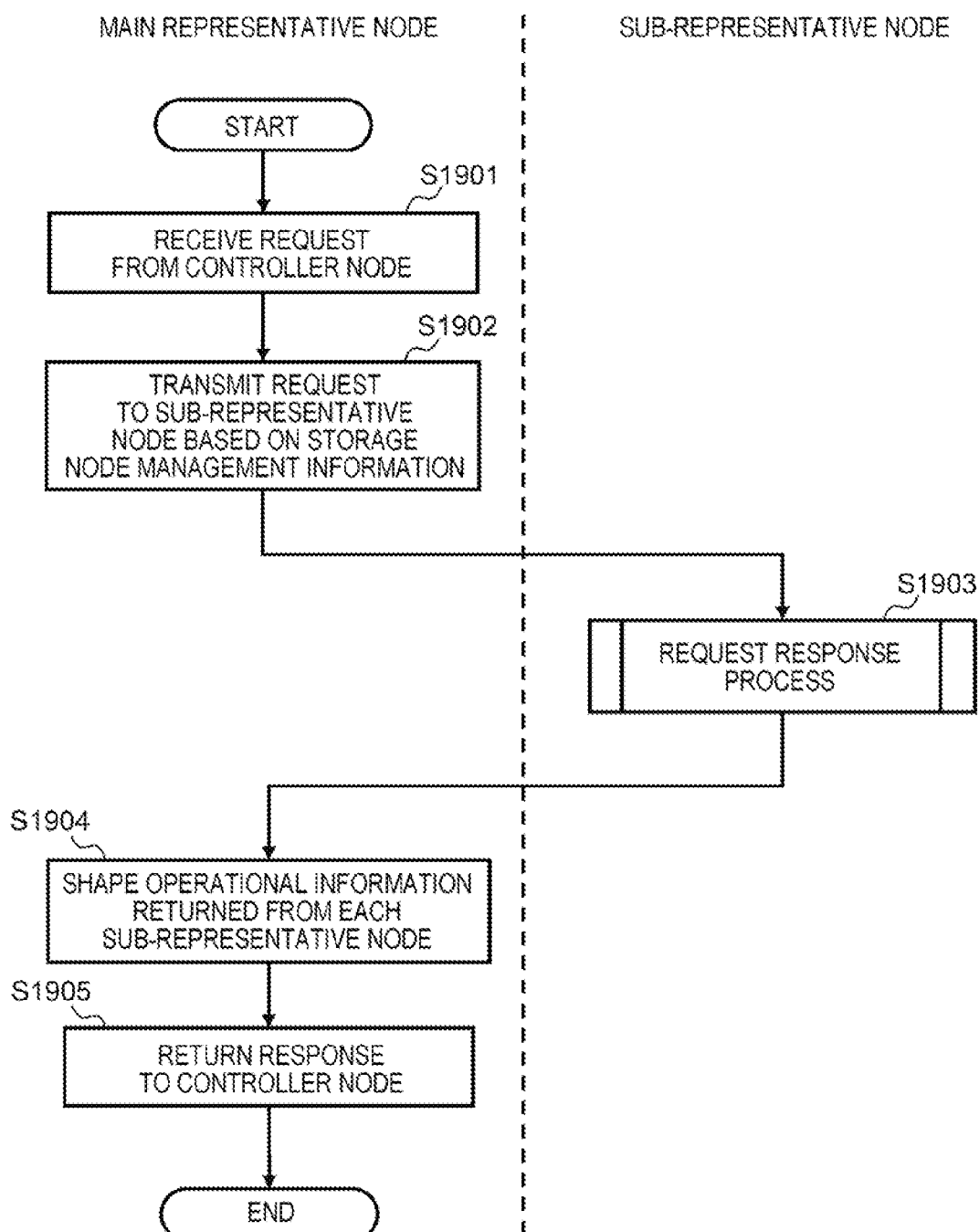
FIG. 19 is a diagram illustrating an example of a procedure related to processing at the time of reception of a request according to the second embodiment.

With reference to FIGS. 17 to 19, the embodiment will be described. The same elements as those of the first embodiment are denoted by the same reference numerals, and a description thereof will be omitted.

FIG. 17 is a diagram illustrating an example of a configuration related to a storage system 2 according to the embodiment. The storage system 2 includes a storage node 1710 (a main representative node), a storage node 210 (a sub-representative node), a storage node 220 (a general node) and the like.

The storage node 1710 serving as the main representative node includes a request control unit 1711 that receives a request from the controller node 110 or transmits the request to a sub-representative node, and storage node management information 1712 in which the storage node 220 of a general node to be taken charge of has been defined. The storage node management information 1712 will be described later using FIG. 18. Furthermore, the request control unit 1711 will be described later using FIG. 19.

When a request is received, the main representative node, for example, transmits the request to the sub-representative node. When the request is received, the sub-representative node performs the same process as that of the representative node of the first embodiment within its own responsibility.

<Operational Information Reference Procedure>

A main reference procedure of operational information will be described below.

(Procedure 1)

The request control unit 1711 of the main representative node receives a request from the management client 241 of the controller node 110.

(Procedure 2)

The request control unit 1711 of the main representative node acquires information on a representative node based on the storage node management information 1712.

(Procedure 3)

The request control unit 1711 of the main representative node transmits the request to the sub-representative node based on the content of the request.

(Procedure 4)

Based on the request distribution information 219, the request control units 211 and 1711 of each main representative node acquire information required for the distribution of an acquisition destination of operational information.

(Procedure 5)

Based on the content of the request and the request distribution information 219, the request control units 211 and 1711 of each main representative node determine the storage node 100 that makes an inquiry and operational information to be returned.

(Procedure 6)

The request control units 211 and 1711 of each main representative node inquire of the storage node 100, which should make an inquiry, about necessary operational information. In addition, the request control units 211 and 1711 may send out a query to each storage node 100 at once or send out the query several times.

(Procedure 7)

The necessary operational information is acquired from the summary monitor DB 218 or each storage node 100.

(Procedure 8)

The request control unit 1711 of the main representative node receives the necessary operational information.

(Procedure 9)

The request control unit 1711 of the main representative node shapes the collected operational information and returns the shaped operational information to the management client 241.

FIG. 18 is a diagram illustrating an example (a storage node management information table 1801) of the storage node management information 1712. In the storage node management information table 1801, information of a fault set is stored in a correlated manner in addition to information of the storage node management information 602.

The fault set is identification information indicating a set of storage nodes 100 that do not stop the entire storage system 2 even though failures occur at the same time. For example, the same fault set is correlated with a group of storage nodes 100 using the same rack, the same power, and the same switch. A group of storage nodes 100 with the same fault set is a range taken charge of by each representative node. In addition, the fault set, for example, is set at the time of initial environment construction.

In the embodiment, a representative node is set for each fault set. Among a plurality of representative nodes, one representative node is set as a main representative node and remaining representative nodes are set as sub-representative nodes.

The coverage of the representative node is not limited to the use of the above-described fault set. For example, it is not fixed like the fault set, but the setting of the coverage may be configured to be dynamically changed (for example, decision of the number of representative nodes and the number of general nodes in accordance with the number of storage nodes 100, dynamical allocation of identification information capable of identifying general nodes belonging to a representative node, and the like).

FIG. 19 is a diagram illustrating an example of a procedure related to processing at the time of reception of a request by the request control unit 1711. The processing at the time of reception of the request is performed based on the fact that the request control unit 1711 of the main representative node receives a request from the controller node 110.

In step S1901, the request control unit 1711 receives a request from the controller node 110.

In step S1902, the request control unit 1711 transmits the request to the sub-representative node based on the content of the request and the storage node management information 1712. For example, the request control unit 1711 analyzes the content of the request, and when it is determined that operational information within a designated time of a specific volume 540 has been requested, the request control unit 1711 specifies the storage node 220 provided with the specific volume 540 based on the request distribution information 219, specifies a sub-representative node responsible for the specified storage node 220 based on the storage node management information 1712, and transmits the request to the specified sub-representative node. In addition, since a case where the request is not transmitted to the sub-representative node is the same as that in the first embodiment, illustration and description thereof will be omitted.

In step S1903, a request response process is performed. In addition, the request response process is basically the same as the process illustrated in FIG. 15, and a transmission source and a transmission destination of the request are not the controller node 110 but the main representative node.

In step S1904, the request control unit 1711 shapes operational information returned from each sub-representative node.

In step S1905, the request control unit 1711 transmits the shaped operational information to the controller node 110 and ends the request response process.

According to the above-described second embodiment, for example, in the storage system, the above-described main representative node specifies a general node that is a target of the above-described received request, specifies a representative node that manages the above-described specified general node based on management information (for example, the storage node management information 1712) in which a management relation between the above-described representative node and general node has been defined, and allows the above-described specified representative node to acquire the request, and the above-described specified representative node acquires the above-described request, decides whether to acquire the resource status information from the above-described general node or to acquire the resource status information from the above-described second storage unit, and transmits the resource status information acquired from the decided acquisition destination to an issuing source of the above-described request.

In the above-described configuration, a plurality of representative nodes share the request response process, so that it is possible to distribute a load applied to the request response process.

Furthermore, in the above-described configuration, for example, even when general nodes to be managed has increased, general nodes taken charge of by the representative node are limited, so that it is possible to appropriately manage resource status information of each general node without increasing a load of the representative node.

In the embodiment, a configuration example in which the representative node includes common request distribution information 219 has been described; however, the invention is not limited thereto. For example, each representative node may have request distribution information (configuration information) of a range to be shared. According to such a configuration, it is possible to reduce an amount of the distribution information, so that it is possible to reduce time required for specifying (searching for) a general node that inquires operational information.

(3) Third Embodiment

When a storage system becomes large (when the number of storage nodes to be managed is large), if one representative node performs all request response processes for requests from the controller node, there is a problem that response performance is degraded. In this regard, in the embodiment, a main representative node shares the request response process according to the state of a sub-representative node, so that response performance is improved.

As the state of the sub-representative node, it is assumed that there are various states such as whether the sub-representative node is in the latest state and whether a processing load of the sub-representative node is high. Hereinafter, a description will be provided for a configuration example in which a main representative node determines the version of configuration information of a sub-representative node (is it configuration information at what point in time? or is it the latest configuration information?) and shares processing by transmitting a request to the sub-representative node.

Figure 20:
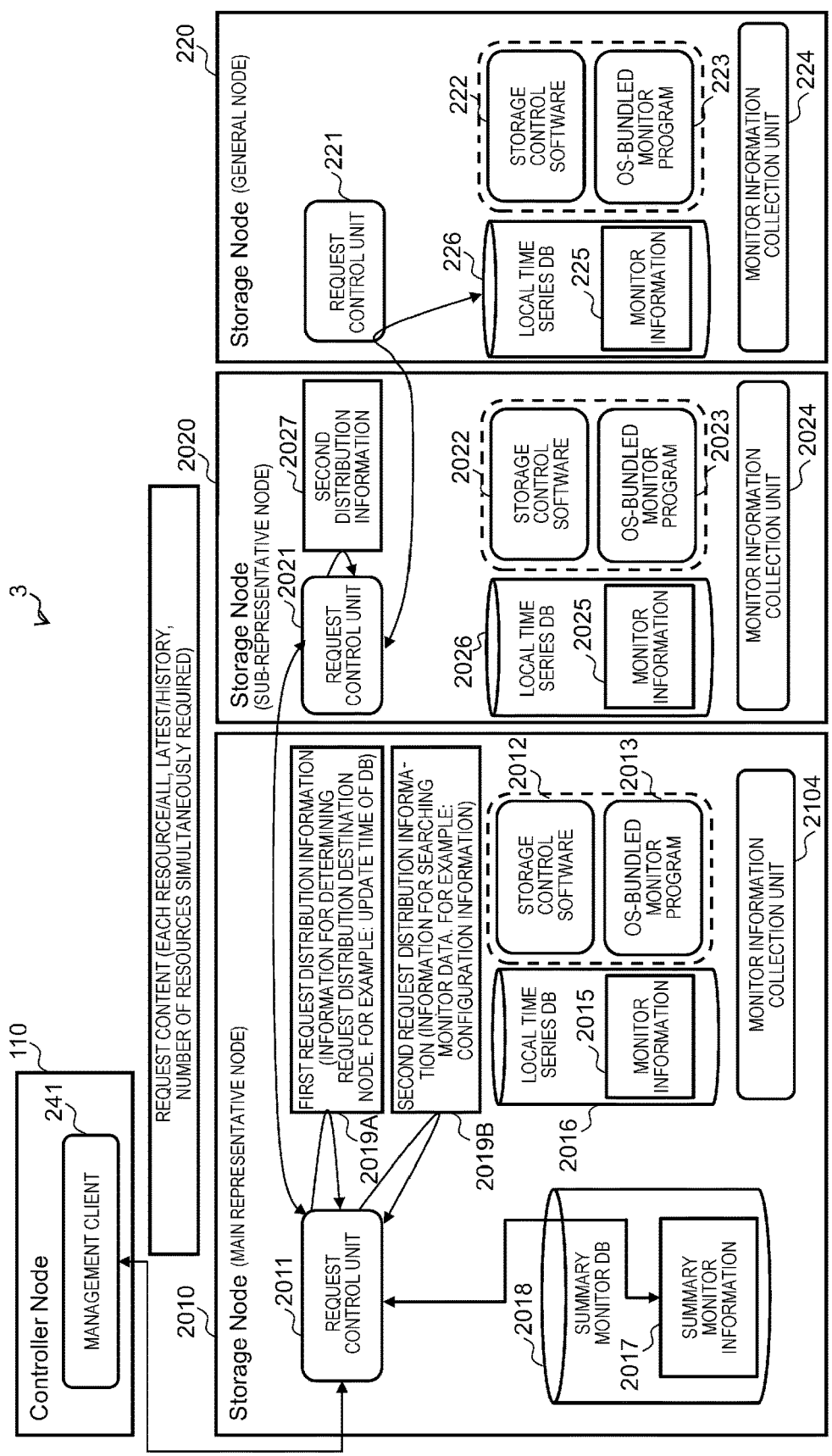
FIG. 20 is a diagram illustrating an example of a configuration related to a storage system according to a third embodiment.

With reference to FIGS. 20 to 22, the embodiment will be described. The same elements as those of the first embodiment are denoted by the same reference numerals, and a description thereof will be omitted.

FIG. 20 is a diagram illustrating an example of a configuration related to a storage system 3 according to the embodiment. The storage system 3 includes a storage node 2010 (a main representative node), a storage node 2020 (a sub-representative node), and a storage node 220 (a general node).

The storage node 2010 serving as the main representative node includes a request control unit 2011, a storage control software 2012, an OS-bundled monitor program 2013, a monitor information collection unit 2014, monitor information 2015, a local time series DB 2016, summary monitor information 2017, a summary monitor DB 2018, first request distribution information 2019A, and second request distribution information 2019B. Since the elements 2012 to 2018 of the main representative node are identical to the elements 212 to 218 of the main representative node of the first embodiment, a description thereof will be omitted.

The request control unit 2011 selects a sub-representative node, which is an acquisition destination of operational information, based on the first request distribution information 2019A when a request is received from the controller node 110, and transmits the request to the selected sub-representative node. When no sub-representative node is selected as the acquisition destination, the request control unit 2011 determines the storage node 100, which acquires the operational information, and operational information to be returned based on the content of the received request and the second request distribution information 2019B.

The first request distribution information 2019A is an example of node status information indicating the status of a representative node and is information used in the distribution of a request from the controller node 110. More specifically, the first request distribution information 2019A is information for determining a representative node, to which the request is distributed, in order to distribute the load of the representative node. For example, the first request distribution information 2019A is information (for example, storage node management information to be described later) including the time at which the second request distribution information 2019B (for example, the configuration information 601) has been synchronized. An example of the storage node management information is illustrated in FIG. 21.

The second request distribution information 2019B is information used to specify a location of operational information. For example, the second request distribution information 2019B is information identical to the request distribution information 219 and is synchronized (duplicated) between the main representative node and the sub-representative node.

The storage node 2020 serving as the sub-representative node includes a request control unit 2021, storage control software 2022, an OS-bundled monitor program 2023, a monitor information collection unit 2024, monitor information 2025, a local time series DB 2026, and second request distribution information 2027. Since the elements 2021 to 2026 of the sub-representative node are identical to the elements 211 to 216 of the main representative node of the first embodiment, a description thereof will be omitted.

The second request distribution information 2027 is obtained through synchronization (duplication) of the second request distribution information 2019B. Based on the content of the transmitted request and the second request distribution information 2027, the request control unit 2021 determines the storage node 100, which acquires the operational information, and operational information to be returned.

In addition, the request control unit 2011 of the main representative node, the request control unit 2021 of the sub-representative node, and the request control unit 221 of the general node may be implemented with the same program or different programs.

<Operational Information Reference Procedure>

A main reference procedure of operational information will be described below.

(Procedure 1)
The request control unit 2011 of the main representative node receives a request from the management client 241 of the controller node 110.
(Procedure 2)
The request control unit 2011 of the main representative node acquires the first request distribution information 2019A used for request distribution.
(Procedure 3)
The request control unit 2011 of the main representative node selects a representative node (own or a sub-representative node), which is a distribution destination of the request, based on the first request distribution information 2019A.
(Procedure 4)
When the selected representative node is a sub-representative node, the request control unit 2011 of the main representative node transmits the request to the sub-representative node.
(Procedure 5)
Each representative node (for example, the request control unit 2011 or 2021) acquires second request distribution information (for example, the second request distribution information 2019B and 2027) used to acquire operational information.
(Procedure 6)
Based on the second request distribution information (for example, the second request distribution information 2019B and 2027), each representative node (for example, the request control unit 2011 or 2021) acquires information necessary for distributing an acquisition destination of the operational information.
(Procedure 7)
Based on the content of the request and the second request distribution information (for example, the second request distribution information 2019B and 2027), each representative node (for example, the request control unit 2011 or 2021) determines the storage node 100 that makes an inquiry and operational information to be returned.
(Procedure 8)
Each representative node (for example, the request control unit 2011 or 2021) inquires of the storage node 100, which should make an inquiry, about necessary operational information. In addition, the request control units 2011 and 2021 may send out a query to each storage node 100 at once or send out the query several times.
(Procedure 9)
The necessary operational information is acquired from the summary monitor DB 218 or each storage node 100.
(Procedure 10)
The request control unit 2011 of the main representative node receives the necessary operational information.
(Procedure 11)
The request control unit 2011 of the main representative node shapes the collected operational information and returns the shaped operational information to the management client 241.

FIG. 21 is a diagram illustrating an example (a storage node management information table 2101) of the storage node management information.

In the storage node management information table 2101, information of a configuration information synchronization time is stored in a correlated manner in addition to the storage node management information 602.

The configuration information synchronization time indicates the time at which the configuration information 601

(the second request distribution information 2019B and 2027) is synchronized between representative nodes.

When a request for acquiring the latest operational information is received, the synchronization time of the configuration information 601 needs to be up-to-date, but when a request for acquiring the past operational information is received, even though the synchronization time of the configuration information 601 is the old time, there is no problem if the synchronization time of the configuration information 601 is newer than the past. When the configuration information 601 is up-to-date, there is no problem in any of requests. That is, based on the synchronization time of the configuration information 601 retained in each representative node, it is possible to perform a request distribution process.

Information used for the request distribution process is not limited to the information of the configuration information synchronization time, and it may be possible to employ the usage amount and the like of resources of the storage node 100 such as the load of the CPU 410 of the storage node 100. In addition, the information used for the request distribution process may be configured to be updated when the main representative node regularly inquires of each sub-representative node, may be configured to be updated when information is transmitted from each sub-representative node to the main representative node, or may be configured to be updated via a recording medium.

FIG. 22 is a diagram illustrating an example of a procedure related to processing at the time of reception of a request by the request control unit 2011. The processing at the time of reception of the request is performed based on the fact that the request control unit 2011 of the main representative node receives a request from the controller node 110.

In step S2201, the request control unit 2011 receives a request from the controller node 110.

In step S2202, the request control unit 2011 determines whether there are sub-representative nodes satisfying a condition of the request. For example, when it is determined that the request is a request for acquiring the latest operational information, the request control unit 2011 determines whether there are sub-representative nodes having the latest configuration information 601 (configuration information 601 having the same update date as that of a main representative node). Furthermore, for example, when it is determined that the request is a request for acquiring the past operational information, the request control unit 2011 determines whether there are sub-representative nodes having configuration information 601 having an update date newer than the past.

When it is determined that there are the sub-representative nodes satisfying the condition of the request, the request control unit 2011 moves the procedure to step S2203, and when it is determined that there are no sub-representative nodes satisfying the condition of the request, the request control unit 2011 moves the procedure to step S2206.

In step S2203, the request control unit 2011 selects one sub-representative node satisfying the condition of the request and transmits the request to the selected sub-representative node.

In step S2204, the request control unit 2011 performs a request response process. In addition, the request response process is basically the same as the process illustrated in FIG. 15, and a transmission source and a transmission destination of the request are not the controller node 110 but the main representative node.

In step S2205, the request control unit 2011 shapes operational information returned from each sub-representative node.

In step S2206, the request control unit 2011 performs a request response process. In addition, since the request response process is basically the same as the process illustrated in FIG. 15, a description thereof will be omitted.

In step S2207, the request control unit 2011 transmits the shaped operational information to the controller node 110 and ends the request response process.

In the above-described third embodiment, for example, in the storage system, the above-described main representative node determines whether the above-described request is to be processed by a sub-representative node, which is the above-described specified representative node, based on the node status information (for example, the information of the configuration information synchronization time and the usage rate of the CPU of the main representative node and the sub-representative node) indicating the status of the above-described main representative node and the above-described sub-representative node, and transmits the above-described request to the above-described sub-representative node when it is determined that the above-described request is to be processed.

According to the above-described configuration, when time is required for the synchronization of configuration information (the second distribution information) between the main representative node and the sub-representative node, a synchronization status (a synchronization time) between each representative node is taken into consideration in order to perform processing with consistency, so that it is possible to distribute the request.

Furthermore, in a case where the status of the representative node is set as the status of a resource, when there is a difference in a processing load between representative nodes, a load applied to the resource is taken into consideration, so that it is possible to distribute the request to a representative node with the lowest load for example.

According to the embodiment, the request response process can be performed in accordance with the status of the representative node, so that it is possible to improve response performance for a request.

(4) Fourth Embodiment

In a large storage system, when operational information is always stored in time series, there is a problem that the amount of disk usage becomes enormous. In this regard, in the embodiment, in order to reduce the amount of disk usage, the operational information is not always stored, and is stored when there is a problem.

Figure 24:
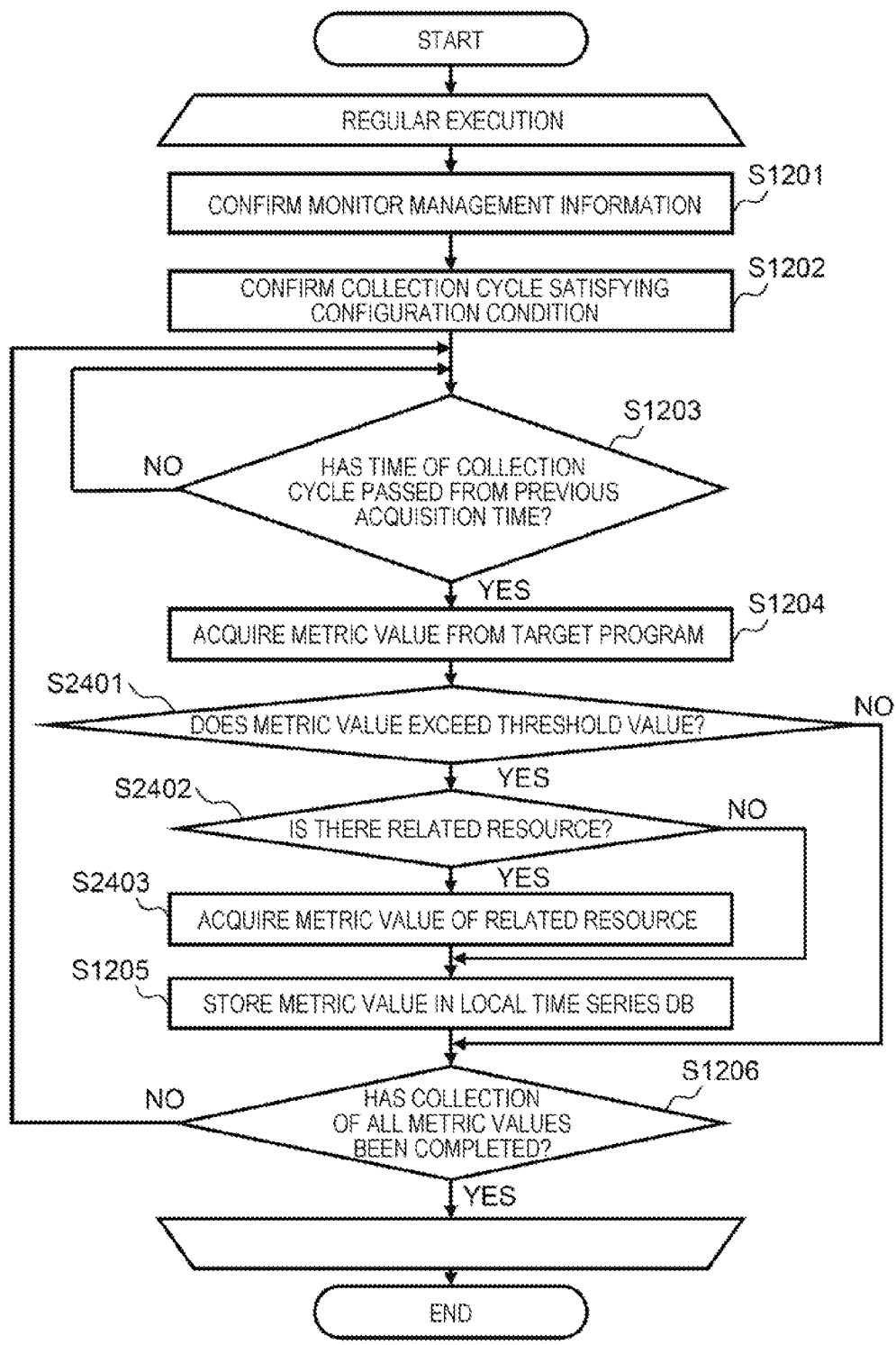
FIG. 24 is a diagram illustrating an example of a procedure related to a monitor information collection process according to the fourth embodiment.

With reference to FIGS. 23 and 24, the embodiment will be described. The same elements as those of the first embodiment are denoted by the same reference numerals, and a description thereof will be omitted.

FIG. 23 is a diagram illustrating an example (a monitor management information table 2301) of the monitor management information. In the monitor management information table 2301, information of a threshold upper limit and a threshold lower limit are stored in a correlated manner in addition to the monitor management information 603.

When a metric value of a resource exceeds a threshold value (when the metric value of the resource exceeds the threshold upper limit or when the metric value of the resource becomes less than the threshold lower limit), a process is performed to store the metric value in the local time series DB 206 as the monitor information 205.

The threshold upper limit and/or the threshold lower limit may be fixed or variable, may be set by a user, or may be automatically changed by a program. For example, as an example of the automatic change, there is a method in which a trend is acquired for a certain period of time, such as baseline monitoring, to allow the program to learn a normal state and a range of the normal state is set as the threshold upper limit and the threshold lower limit. Furthermore, a configuration example in which both the threshold upper limit and the threshold lower limit are provided will be described; however, the invention is not limited thereto and any one of the threshold upper limit and the threshold lower limit may be provided.

FIG. 24 is a diagram illustrating an example of a procedure related to a monitor information collection process in the embodiment. The same processes as those of the monitor information collection process illustrated in FIG. 12 is denoted by the same reference numerals, and a description thereof will be omitted.

In step S2401, the monitor information collection unit 204 determines whether an acquired metric value exceeds a threshold value (whether the acquired metric value exceeds the threshold upper limit and becomes less than the threshold lower limit). When it is determined that the acquired metric value exceeds the threshold value, the monitor information collection unit 204 moves the procedure to step S2402, and when it is determined that the acquired metric value does not exceed the threshold value, the monitor information collection unit 204 moves the procedure to step S1206.

In step S2402, based on the configuration information 601, the monitor information collection unit 204 determines whether there are resources (related resources) related to a metric of the acquired metric value. When it is determined that there are the related resources, the monitor information collection unit 204 moves the procedure to step S2403, and when it is determined that there are no related resources, the monitor information collection unit 204 moves the procedure to step S1205. The related resources indicate a series of resources in which a path has been extended.

In step S2403, the monitor information collection unit 204 acquires metric values of the related resources and moves the procedure to step S1205.

As described above, when the metric value exceeds the threshold value, the metric is not only simply stored, but also stored even though the metric values of the related resources do not exceed the threshold value because there is a potential problem in the related resources in the storage system. Additionally, since the metric values of the related resources are acquired, when the abnormality of the volume 540 is confirmed for example, all the metric values of resources such as the pool 510, the drive 520, and the port 550 are collated, so that it is possible to recognize abnormality in the storage system.

In addition, since the summary monitor information 217 is the same as above, illustration and description thereof will be omitted.

Furthermore, even though the metric values do not exceed the threshold value, the metric values may be configured to be stored for a certain period of time (for example, several minutes)

According to the embodiment, the resource status information is stored when the resource status information exceeds the threshold value, so that it is possible to reduce the amount of disk usage.

(5) Other Embodiments

In the above-described embodiments, cases where the invention is applied to the storage system have been described; however, the invention is not limited thereto and can be widely applied to other systems, storage devices, and information management methods.

Furthermore, information of programs, tables, and files for performing each function in the above-described description can be placed on storage devices such as other computers, memories, hard disks, and SSDs or recording media such as an IC card, an SD card, and a DVD.

Furthermore, the above-described configurations may be appropriately modified, rearranged, combined, or omitted without departing from the scope of the invention.

According to the above-described configurations, the resource status information is appropriately managed, so that for example, the storage system can be quickly and easily maintained in a normal state.

Furthermore, according to the above-described configurations, it is possible to implement a storage system with high maintainability.

What is claimed is:

1. A storage system comprising a plurality of representative nodes and a plurality of general nodes including a plurality of resources,
   wherein each of the plurality of representative nodes and the plurality of general nodes comprises:
   a processor;
   wherein
      each of the general nodes stores resource status information indicating respective statuses of the plurality of resources in a first storage unit thereof,
      the plurality of representative nodes stores resource status information collected from the plurality of general nodes in a second storage unit thereof, decides whether to acquire the resource status information from the first storage unit of one of the general nodes or to acquire the resource status information from the second storage unit based on a received request, and transmits the resource status information acquired from a decided acquisition destination to an issuing source of the request,
      the plurality of representative nodes includes a main representative node,
      the main representative node specifies a general node that is a target of the received request, specifies a representative node, which manages the specified general node, based on management information in which a management relation between the specified representative node and the specified general node has been defined, and allows the specified representative node to acquire the request, and
      the specified representative node acquires the request, decides whether to acquire the resource status information from the specified general node or to acquire the resource status information from the second storage unit of the specified representative node, and transmits the resource status information acquired from a decided acquisition destination to an issuing source of the request.

2. The storage system according to claim 1, wherein
   at least one of the plurality of representative nodes includes a plurality of resources, stores resource status information indicating respective statuses of the plurality of resources in a first storage unit thereof, and stores resource status information collected from the first storage units of the plurality of general nodes and the representative node in the second storage unit.

3. The storage system according to claim 1, wherein
at least one of the plurality of representative nodes determines whether it is possible to acquire resource status information related to the received request from the second storage unit, and acquires the resource status information from the first storage unit of the specified general node when it is determined that it is not possible to acquire the resource status information related to the request.

4. The storage system according to claim 1, wherein
a frequency at which the general nodes acquire resource status information from each resource is higher than a frequency at which the plurality of representative nodes acquires the resource status information from the general nodes.

5. The storage system according to claim 1, wherein
a period for which at least one of the plurality of representative node stores a history of the resource status information is longer than a period for which the general nodes stores a history of the resource status information.

6. The storage system according to claim 1, wherein
the plurality of representative nodes stores summarized resource status information.

7. The storage system according to claim 6, wherein
the summarized resource status information is summarized in a time direction, and a node that acquires the resource status information is decided based on designation of a time included in the request.

8. The storage system according to claim 6, wherein
the summarized resource status information is summarized by aggregating resource status information of the plurality of general nodes, and
a node that acquires the resource status information is decided based on designation of a node included in the request.

9. The storage system according to claim 1, wherein
based on the number of the general nodes that performs acquisition when the resource status information is acquired from the general nodes, it is decided whether to acquire the resource status information from any one of the general nodes or the second storage unit.

10. The storage system according to claim 1, wherein, when the resource status information is acquired from the general nodes, at least one of the representative nodes acquires the resource status information by specifying the general node based on history information indicating any one of the plurality of general nodes, which is provided with a resource that is a target of the resource status information, or range information indicating a range in which the resource is movable.

11. The storage system according to claim 1, wherein
the main representative node determines whether the request is to be processed by a sub-representative node, which is the specified representative node, based on node status information indicating a status of the main representative node and the sub-representative node, and transmits the request to the sub-representative node when it is determined that the request is to be processed.

12. The storage system according to claim 1, wherein
the general nodes store resource status information of a resource of the plurality of resources, in which the resource status information exceeds a threshold value.

13. An information management method in a storage system including a plurality of representative nodes and a plurality of general nodes including a plurality of resources, the method comprising:
a first step in which each of the general nodes stores resource status information indicating respective statuses of the plurality of resources in a first storage unit thereof;
a second step in which the representative node stores resource status information collected from the plurality of general nodes in a second storage unit thereof; and
a third step in which the representative node decides whether to acquire the resource status information from the first storage unit of the general node or to acquire the resource status information from the second storage unit based on a received request, and transmits the resource status information acquired from a decided acquisition destination to an issuing source of the request,
wherein
the plurality of representative nodes includes a main representative node,
the main representative node specifies a general node that is a target of the received request, specifies a representative node, which manages the specified general node, based on management information in which a management relation between the specified representative node and the specified general node has been defined, and allows the specified representative node to acquire the request, and
the specified representative node acquires the request, decides whether to acquire the resource status information from the specified general node or to acquire the resource status information from the second storage unit of the specified representative node, and transmits the resource status information acquired from a decided acquisition destination to an issuing source of the request.

* * * * *